(12) United States Patent
Nakajima et al.

(10) Patent No.: US 7,369,278 B2
(45) Date of Patent: May 6, 2008

(54) IMAGE-PROCESSING APPARATUS, IMAGE-PROCESSING METHOD, IMAGE-PROCESSING PROGRAM AND IMAGE-RECORDING APPARATUS

(75) Inventors: Takeshi Nakajima, Hino (JP); Tsukasa Ito, Musashino (JP); Tsuyoshi Hattori, Hidaka (JP); Shoichi Nomura, Hachioji (JP); Chizuko Ikeda, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 862 days.

(21) Appl. No.: 10/731,746

(22) Filed: Dec. 8, 2003

(65) Prior Publication Data

US 2004/0120014 A1 Jun. 24, 2004

(30) Foreign Application Priority Data

Dec. 11, 2002 (JP) ............................. 2002-359310

(51) Int. Cl.
*H04N 1/405* (2006.01)

(52) U.S. Cl. .................................... 358/3.26; 358/3.27

(58) Field of Classification Search ......... 358/3.24–3.27, 358/1.9, 2.1, 531; 382/254, 267
See application file for complete search history.

(56) References Cited

U.S. PATENT DOCUMENTS 5,266,805 A 11/1993 Edgar

| 5,606,631 | A | * | 2/1997 | Weiss et al. ............... 382/275 |
| 5,815,198 | A | | 9/1998 | Vachtsevanos et al. |
| 6,697,126 | B2 | * | 2/2004 | Moni et al. ............... 348/616 |
| 7,164,496 | B2 | * | 1/2007 | Tatsumi ..................... 358/1.9 |

FOREIGN PATENT DOCUMENTS

| DE | 195 27 179 C1 | | 1/1997 |
| EP | 0 569 142 A1 | | 11/1993 |
| EP | 636299 A1 | * | 2/1995 |
| JP | 06-028468 | | 2/1994 |

* cited by examiner

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

There is described an image-processing apparatus, which makes it possible to compensate for the defect pixel without causing a sense of incongruity in the image. The apparatus includes an image signal acquiring section to acquire the image signals representing an image recorded on a recording medium, a recognizing section to recognize a presence or absence of a defect pixel possibly included in the image signals and a compensating section to compensate for the defect pixel. The compensating section compensates for the defect pixel so that first order differential values of image signals of the defect pixel and those of non-defect pixels adjacent to the defect pixel continue to each other. The compensating section applies a multi-resolution conversion processing to the image signals so as to decompose them into high frequency band components and a low frequency band component, signal intensities of which are compensated for.

24 Claims, 12 Drawing Sheets

IMAGE-PROCESSING APPARATUS, IMAGE-PROCESSING METHOD, IMAGE-PROCESSING PROGRAM AND IMAGE-RECORDING APPARATUS

BACKGROUND OF THE INVENTION

The present invention relates to image-processing apparatus, image-processing method, image-processing program and image-recording apparatus.

Recently, when developing a photographic image or producing additional prints of the photographic image, there has been conducted such a processing that an image formed on either a color photographic film or a photographic printing paper are converted to a plurality of image signals by transmitting or reflecting three primary colors of R, G, B through/from the image, and by photoelectrically reading the image with the CCD (Charge Coupled Device) sensor, etc.

After having been subjected to various types of image processing represented by negative/positive reversal, brightness adjustment, color balance adjustment, removal of granular noise and enhancement of sharpness, such image signals are distributed through such media as a CD-R, floppy (R) disk and memory card or via the Internet, and are outputted as hard copy images on silver halide photographic paper by an inkjet printer, thermal printer or the like. Alternatively, such image signals are displayed on the medium such as CRT, liquid crystal display or plasma display to be viewed.

Incidentally, when the negative or positive photographic films, photographic prints, etc. are roughly handled or stored under a bad condition, sometimes scars are formed on the surface of them, or various kinds of dirt, such as dusts, fingerprints, etc., are adhered to them. Such the defects of the recording medium refract and/or absorb the image reading light, and therefore, influence the image signals so as to cause image defects of the reproduced image.

Such the defects of the recording medium impede the transmission of the infrared radiation light, while the other parts of the recording medium permit the transmission of the infrared radiation light regardless of the presence or absence of a colored area. By employing this phenomenon, image signals of a pixel corresponding to the defect of the recording medium have been compensated for, based on the infrared image signals acquired by scanning the recording medium with the infrared radiation light other than the image reading light (for instance, set forth in Patent Document 1). According to the abovementioned method, a pixel, at which the signal intensity of the infrared image signal exceeds a certain threshold level, is determined as a defect pixel. Then, when an image signal is larger than the certain threshold level, the defect pixel is compensated for by dividing the concerned image signal by the infrared image signal, while, when an image signal is smaller than the certain threshold level, the defect pixel is compensated for by an interpolation processing based on the signal intensities of the pixels located around the periphery of the defect pixel.

Patent Document 1: Tokkaihei 6-28468 (JP2559970)

According to the abovementioned conventional method for compensating for the defect pixel as set forth in Patent Document 1, however, although it has been possible to compensate for the defect pixel, contained in a flat image, such as, for instance, a wall image, etc., in which colors and brightness slightly change, in a state of keeping continuity with the non-defect pixels without any problem, it has been impossible to eliminate discontinuity between the defect pixel and the non-defect pixels even when compensation processing is applied for such an image as a close-up human face, etc., having a very fine image structure, resulting in occurrence of discontinuity which might yields slight unevenness in the image, and such the unevenness cause a sense of incongruity for face expressions, a feel of material, etc.

SUMMARY OF THE INVENTION

To overcome the abovementioned drawbacks in conventional image-processing methods, it is an object of the present invention to provide an image-processing method, an image-processing apparatus, an image-processing program and an image-recording apparatus, each of which makes it possible to compensate for the defect pixel without causing a sense of incongruity in the image.

Accordingly, to overcome the cited shortcomings, the abovementioned object of the present invention can be attained by image-processing methods, image-processing apparatus, image-processing programs and image-recording apparatus described as follow.

(1) An apparatus for processing image signals, comprising: an image signal acquiring section to acquire the image signals representing an image recorded on a recording medium; a recognizing section to recognize a presence or absence of a defect pixel possibly included in the image signals; and a compensating section to compensate for the defect pixel recognized by the recognizing section; wherein the compensating section compensates for the defect pixel so that first order differential values of image signals of the defect pixel and those of non-defect pixels adjacent to the defect pixel continue to each other.

(2) The apparatus of item 1, wherein the compensating section initially applies a multi-resolution conversion processing to the image signals so as to decompose them into high frequency band components and a low frequency band component, and then, compensates for signal intensities of the high frequency band components and a signal intensity of the low frequency band component, respectively, and finally, applies a multi-resolution inverse-conversion processing to compensated high frequency band components and a compensated low frequency band component so as to compensate for the defect pixel included in the image signals.

(3) The apparatus of item 2, wherein the multi-resolution conversion processing is a Dyadic Wavelet transform.

(4) The apparatus of item 1, wherein the image signal acquiring section acquires the image signals by scanning the image recorded on the recording medium with an image reading light.

(5) The apparatus of item 4, further comprising: a defect-detecting signal acquiring section to acquire defect detecting signals by scanning the image recorded on the recording medium with a defect detecting light; wherein the recognizing section applies a multi-resolution conversion processing to the defect detecting signals acquired by the defect-detecting signal acquiring section, and then, recognizes the presence or absence of the defect pixel, based on converted signals.

(6) The apparatus of item 5, wherein the multi-resolution conversion processing is a Dyadic Wavelet transform.

(7) A method for processing image signals, comprising the steps of: acquiring the image signals representing an image recorded on a recording medium; recognizing a presence or absence of a defect pixel possibly included in the image signals; compensating for the defect pixel recognized by the recognizing section; wherein, in the compensating step, the defect pixel is compensated for, so that first order differential values of image signals of the defect pixel and those of non-defect pixels adjacent to the defect pixel continue to each other.

(8) The method of item 7, wherein, in the compensating step, a multi-resolution conversion processing is initially applied to the image signals so as to decompose them into high frequency band components and a low frequency band component, and then, signal intensities of the high frequency band components and a signal intensity of the low frequency band component are respectively compensated for, and finally, a multi-resolution inverse-conversion processing is applied to compensated high frequency band components and a compensated low frequency band-component so as to compensate for the defect pixel included in the image signals.

(9) The method of item 8, wherein the multi-resolution conversion processing is a Dyadic Wavelet transform.

(10) The method of item 7, wherein, in the acquiring step, the image signals are acquired by scanning the image recorded on the recording medium with an image reading light.

(11) The method of item 10, further comprising the step of: acquiring defect detecting signals by scanning the image recorded on the recording medium with a defect detecting light; wherein, in the recognizing step, a multi-resolution conversion processing is applied to the defect detecting signals acquired by the defect-detecting signal acquiring section, and then, the presence or absence of the defect pixel is recognized, based on converted signals.

(12) The method of item 11, wherein the multi-resolution conversion processing is a Dyadic Wavelet transform.

(13) A computer program for executing operations for processing image signals, comprising the functional steps of: acquiring the image signals representing an image recorded on a recording medium; recognizing a presence or absence of a defect pixel possibly included in the image signals; compensating for the defect pixel recognized by the recognizing section; wherein, in the compensating step, the defect pixel is compensated for, so that first order differential values of image signals of the defect pixel and those of non-defect pixels adjacent to the defect pixel continue to each other.

(14) The computer program of item 13, wherein, in the compensating step, a multi-resolution conversion processing is initially applied to the image signals so as to decompose them into high frequency band components and a low frequency band component, and then, signal intensities of the high frequency band components and a signal intensity of the low frequency band component are respectively compensated for, and finally, a multi-resolution inverse-conversion processing is applied to compensated high frequency band components and a compensated low frequency band component so as to compensate for the defect pixel included in the image signals.

(15) The computer program of item 14, wherein the multi-resolution conversion processing is a Dyadic Wavelet transform.

(16) The computer program of item 13, wherein, in the acquiring step, the image signals are acquired by scanning the image recorded on the recording medium with an image reading light.

(17) The computer program of item 16, further comprising the functional step of: acquiring defect detecting signals by scanning the image recorded on the recording medium with a defect detecting light; wherein, in the recognizing step, a multi-resolution conversion processing is applied to the defect detecting signals acquired by the defect-detecting signal acquiring section, and then, the presence or absence of the defect pixel is recognized, based on converted signals.

(18) The computer program of item 17, wherein the multi-resolution conversion processing is a Dyadic Wavelet transform.

(19) An apparatus for recording an output image onto an outputting medium, comprising: an image signal acquiring section to acquire image signals representing an image recorded on a recording medium; a recognizing section to recognize a presence or absence of a defect pixel possibly included in the image signals; and a compensating section to compensate for the defect pixel recognized by the recognizing section; an image recording section to record the output image onto the outputting medium, based on compensated image signals outputted from the compensating section; wherein the compensating section compensates for the defect pixel so that first order differential values of image signals of the defect pixel and those of non-defect pixels adjacent to the defect pixel continue to each other.

(20) The apparatus of item 19, wherein the compensating section initially applies a multi-resolution conversion processing to the image signals so as to decompose them into high frequency band components and a low frequency band component, and then, compensates for signal intensities of the high frequency band components and a signal intensity of the low frequency band component, respectively, and finally, applies a multi-resolution inverse-conversion processing to compensated high frequency band components and a compensated low frequency band component so as to compensate for the defect pixel included in the image signals.

(21) The apparatus of item 20, wherein the multi-resolution conversion processing is a Dyadic Wavelet transform.

(22) The apparatus of item 19, wherein the image signal acquiring section acquires the image signals by scanning the image recorded on the recording medium with an image reading light.

(23) The apparatus of item 22, further comprising: a defect-detecting signal acquiring section to acquire defect detecting signals by scanning the image recorded on the recording medium with a defect detecting light; wherein the recognizing section applies a multi-resolution conversion processing to the defect detecting signals acquired by the defect-detecting signal acquiring section, and then, recognizes the presence or absence of the defect pixel, based on converted signals.

(24) The apparatus of item 23, wherein the multi-resolution conversion processing is a Dyadic Wavelet transform.

Further, to overcome the abovementioned problems, other image-processing methods, other image-processing apparatus, other image-processing programs and other image-recording apparatus, embodied in the present invention, will be described as follow:

(25) An image-processing apparatus, characterized in that, in the image-processing apparatus, which is provided with an image signal acquiring section to acquire the image signals representing an image recorded on a recording medium, a discriminating section to discriminate a presence or absence of a defect pixel in the image signals and a compensating section to compensate for the defect pixel discriminated by the discriminating section, the compensating section compensates for the defect pixel so that first order differential values of image signals of the defect pixel and those of non-defect pixels adjacent to the defect pixel continue to each other.

(26) An image-processing method, characterized in that, in the image-processing method, which includes an image signal acquiring process for acquiring the image signals representing an image recorded on a recording medium, a discriminating process for discriminating a presence or absence of a defect pixel in the image signals and a compensating process for compensating for the defect pixel discriminated by the discriminating process, in the compensating process, the defect pixel is compensated for so that first order differential values of image signals of the defect pixel and those of non-defect pixels adjacent to the defect pixel continue to each other.

(27) An image-processing program, characterized in that, in the image-processing program, which makes a computer, for conducting image-processing for an image recorded on a recording medium, to realize an image signal acquiring function for acquiring the image signals representing an image recorded on a recording medium, a discriminating function for discriminating a presence or absence of a defect pixel in the image signals and a compensating function for compensating for the defect pixel discriminated by the discriminating process, when realizing the compensating function, the defect pixel is compensated for so that first order differential values of image signals of the defect pixel and those of non-defect pixels adjacent to the defect pixel continue to each other.

(28) An image-recording apparatus, characterized in that, in the image-recording apparatus, which is provided with an image signal acquiring section to acquire the image signals representing an image recorded on a recording medium, a discriminating section to discriminate a presence or absence of a defect pixel in the image signals, a compensating section to compensate for the defect pixel discriminated by the discriminating section, and an image recording section to output compensated image signals so as to record an image on an outputing medium, the compensating section compensates for the defect pixel so that first order differential values of image signals of the defect pixel and those of non-defect pixels adjacent to the defect pixel continue to each other.

According to the invention, described in anyone of items 1, 7, 13, 19 and 25-28, by compensating for the defect pixel so that first order differential values of image signals of the defect pixel and those of the non-defect pixels adjacent to the defect pixel continue to each other, it becomes possible to obtain the compensated image as a natural image without generating discontinuity, which yields slight unevenness in the image, and without giving a sense of incongruity to the viewer.

(29) The image-processing apparatus, described in item 25, characterized in that, the compensating section conducts a multi-resolution conversion processing for the image signals, and compensates for the defect pixel in the image signals by conducting a multi-resolution inverse-conversion processing after compensating for signal intensities of high frequency band components and a low frequency band component of the image signals decomposed by the multi-resolution conversion processing.

(30) The image-processing method, described in item 26, characterized in that, in the compensating process, when compensating for the image signals, a multi-resolution conversion processing is conducted for the image signals, and a multi-resolution inverse-conversion processing is conducted after respectively compensating for signal intensities of high frequency band components and a low frequency band component of the image signals decomposed by the multi-resolution conversion processing.

(31) The image-processing program, described in item 27, characterized in that, when realizing the compensating function, a multi-resolution conversion processing is conducted for the image signals, and the defect pixel in the image signals is compensated for by conducting a multi-resolution inverse-conversion processing after compensating for signal intensities of high frequency band components and a low frequency band component of the image signals decomposed by the multi-resolution conversion processing.

(32) The image-recording apparatus, described in item 28, characterized in that, the compensating section conducts a multi-resolution conversion processing for the image signals, and compensates for the defect pixel in the image signals by conducting a multi-resolution inverse-conversion processing after compensating for signal intensities of high frequency band components and a low frequency band component of the image signals decomposed by the multi-resolution conversion processing.

According to the invention, described in anyone of items 2, 8, 14, 20 and 29-32, by applying the multi-resolution conversion processing to the image signals, and then, applying the compensation processing to acquired multi-resolution signals, and finally, applying a multi-resolution inverse-conversion processing, it becomes possible to compensate for the defect pixel so that first order differential values of image signals of the defect pixel and those of non-defect pixels adjacent to the defect pixel continue to each other. It becomes possible to obtain the compensated image as a natural image without generating discontinuity, which yields slight unevenness in the image, and without giving a sense of incongruity to the viewer.

(33) The image-processing apparatus, described in item 29, characterized in that, the multi-resolution conversion processing is a Dyadic Wavelet transform.

(34) The image-processing method, described in item 30, characterized in that, the multi-resolution conversion processing is a Dyadic Wavelet transform.

(35) The image-processing program, described in item 31, characterized in that, the multi-resolution conversion processing is a Dyadic Wavelet transform.

(36) The image-recording apparatus, described in item 32, characterized in that, the multi-resolution conversion processing is a Dyadic Wavelet transform.

According to the invention, described in anyone of items 3, 9, 15, 21 and 33-36, since the down-sampling operation is not required when converting the image signals, it becomes possible to conduct the compensation processing of the defect pixel in more detail than ever, without thinning out the defect pixel itself and/or the non-defect pixels adjacent to the defect pixel. Therefore, even for an image having fine structures such as a close-up image of human face, it becomes possible to compensate for the image so as to obtain a natural image without spoiling the expression of the face or the feel of its material.

(37) The image-processing apparatus, described in anyone of items 25, 29, 33, characterized in that, the image signal acquiring section acquires the image signals by scanning the image recorded on the recording medium with an image reading light; and the discriminating section conduct a multi-resolution conversion processing for defect detecting signals acquired by scanning the image recorded on the recording medium with a defect detecting light, in order to discriminate the presence or absence of the defect pixel, based on multi-resolution converted signals.

(38) The image-processing method, described in anyone of items 26, 30, 34, characterized in that, in the image signal acquiring process, the image signals are acquired by scanning the image recorded on the recording medium with an image reading light; and in the discriminating process, a multi-resolution conversion processing is conducted for defect detecting signals acquired by scanning the image recorded on the recording medium with a defect detecting light, in order to discriminate the presence or absence of the defect pixel, based on multi-resolution converted signals.

(39) The image-processing program, described in anyone of items 27, 31, 35, characterized in that, when realizing the image signal acquiring function, the image signals are acquired by scanning the image recorded on the recording medium with an image reading light; and when realizing the discriminating function, a multi-resolution conversion processing is conducted for defect detecting signals acquired by scanning the image recorded on the recording medium with a defect detecting light, in order to discriminate the presence or absence of the defect pixel, based on multi-resolution converted signals.

(40) The image-recording apparatus, described in anyone of items 28, 32, 36, characterized in that, the image signal acquiring section acquires the image signals by scanning the image recorded on the recording medium with an image reading light; and the discriminating section conduct a multi-resolution conversion processing for defect detecting signals acquired by scanning the image recorded on the recording medium with a defect detecting light, in order to discriminate the presence or absence of the defect pixel, based on multi-resolution converted signals.

According to the invention, described in anyone of items 5, 11, 17, 23 and 33-36, since the high frequency band components of the defect detecting signals, acquired by applying the Dyadic Wavelet transform, include little noise component, it becomes possible to accurately recognize the defect pixel. Further, by recognizing the defect pixel in a multi-resolution space and by compensating for the image signal corresponding to the recognized defect pixel in the same multi-resolution space, it becomes possible to make the compensated image having more natural impression than ever.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
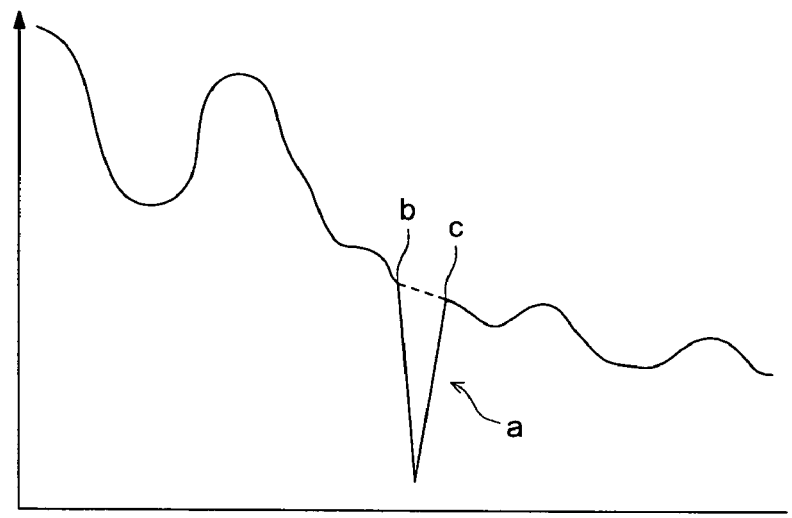
FIG. 1($a$) and FIG. 1($b$) show typical graphs of the image signal having the defect pixel.
Figure 1:
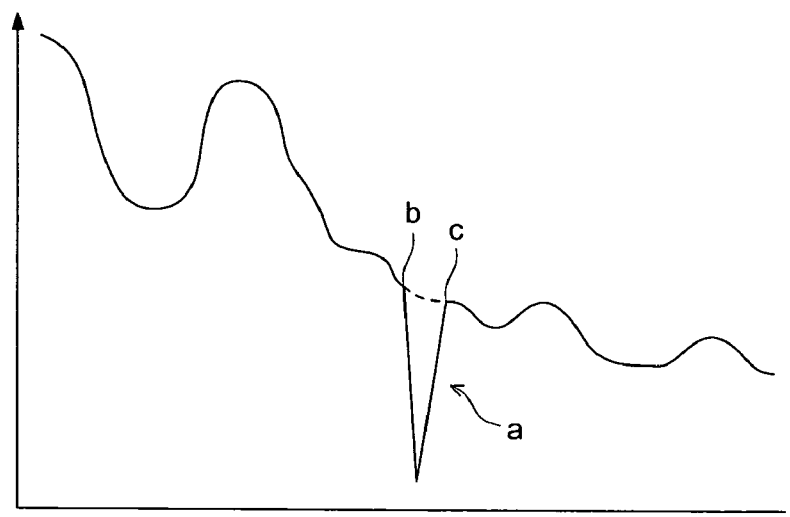

Referring to the drawings, an embodiment of the present invention will be detailed in the following.

The present invention relates to an image-processing method, an image-processing apparatus, an image-processing program and an image-recording apparatus, each of which acquires the image signals of the image stored in a recording medium, and recognizes the presence or absence of the defect pixel in the image signals, and compensates for the image signals so that first order differential values of the image signals of the defect pixel and those of the non-defect pixels adjacent to the defect pixel continue to each other.

Here, the image is divided into a lot of small areas, and the image signals are represented by the signal intensities of brightness of each color component for every area.

The "recording medium on which an image is recorded" is defined as one of various kinds of analogue recording mediums including a negative film on which an image captured by an analogue camera is recorded, etc., a transparent recording medium such as a reversal film, etc., a non-transparent recording medium such as a silver-halide printing paper on which an image is already developed and formed, etc. Further, it would be applicable that the recording medium is also defined as one of various kinds of digital recording mediums including a floppy (Registered Trade Mark) disk, a PC card, etc., in which an image captured by an digital camera is stored in a form of image data. In the following descriptions, the term of "recording medium" represents one of analogue recording mediums, unless otherwise specified.

An image recorded on the recording medium is photoelectronically read by an image reading light and a photoelectronic converting element, such as a CCD sensor, etc., to acquire image signals of the image. Generally speaking, three visible lights of R (Red), G (Green), B (Blue), serving as the image reading lights, are employed for reading a color image. Incidentally, when employing three visible lights of R, G, B, the image signals are acquired for every color component. Even when the digital camera, etc., is employed for capturing a subject, image signals are acquired for each of R, G, B.

The "defect pixel" indicates such a state that the pixel does not exhibit signal intensity to be originally provided for the pixel concerned due to a certain cause, and is defined as such a pixel, which causes image defects, such as discontinuity, blurredness, etc., in the outputted image. For instance, scars formed on the surface of the recording medium, various kinds of dirt, such as dusts, fingerprints, etc., adhered onto the surface, etc., are cited as the causes for generating the image defect. Such the defects of the recording medium refract and/or absorb the image reading light, and therefore, influence the image signals so as to generate the defect pixels in the reproduced image.

As a method of detecting the defect pixel, it has been performed that the infrared light is employed as a defect detecting light, and the defect of the recording medium is photoelectronically read by scanning the recording medium with the infrared light. The defects of the recording medium impede the transmission of the infrared radiation light, while the other parts of the recording medium permit the transmission of the infrared radiation light regardless of the presence or absence of a colored area. By employing this phenomenon, it becomes possible to acquire the defects of the recording medium, namely, the defect detection signals only representing the extracted image defects (the defect pixels) (refer to Patent Document 1). Incidentally, the defect detecting light employed in the present invention is not limited to the infrared radiation light, but any kind of light can be employed for this purpose as far as the light is capable of detecting the image defect. For instance, a visible light having a wavelength, being different from those of the ultraviolet light or the image reading light, would be also applicable for this purpose.

Further, it is possible to recognize the presence or absence of the defect pixel, based on the defect detecting signals acquired by the abovementioned method or another method for detecting the image defect.

In case of compensating for the defect pixel in a color image, it is necessary to conduct the compensating operation for every one of image signals of R, G, B. It is also applicable, for instance, that the compensating operation is conducted after dividing each of the image signals of R, G, B into luminance signals and chrominance signals (YIQ base, HSV base, YUV base or XYZ base of CIE1931 color system, L*a*b base, L*u*v base recommended by CIE1976, based on sRGB or NTSC standard, those are well-known for a person skilled in the art).

In the present invention, "to compensate for the image signals so that first order differential values of the image signals of the defect pixel and those of the non-defect pixels adjacent to the defect pixel continue to each other" is to compensate for the signal intensities of the defect pixel so that the signal intensities of the defect pixel depict a continuously curved line (or linear line) while smoothly changing. In addition, each of the "first order differential values" indicates an inclination of the signal intensities between the pixels represented by the image signals.

FIG. 1(a) and FIG. 1(b) show typical graphs of the image signal having the defect pixel. Both curves depicted in FIG. 1(a) and FIG. 1(b) indicate the same image signal, and distances between positions of pixels, and a certain position in the recording medium are plotted on the horizontal axis, while signal intensities of the image signals for every pixel are plotted on the vertical axis.

As shown in FIG. 1(a), according to the conventional compensation processing, the signal intensity of defect pixel "a" is compensated for, so that it coincides with an average value of signal intensities of non-defect pixels "b", "c", and the signal intensity of non-defect pixel "b" is jointed to that of non-defect pixel "c" with a linear line between them. Accordingly, sometimes, the viewer feels a sense of incongruity for the compensated image. On the other hand, as shown in FIG. 1(b), according to the present invention, since the signal intensity of the defect pixel is compensated for, so that the first order differential values of the image signals of the defect pixel and those of the non-defect pixels adjacent to the defect pixel continue to each other, namely, the signal intensities of the defect pixel depict the continuously curved line, it becomes possible to obtain the compensated image as a natural image without generating discontinuity, which yields slight unevenness in the image, and without giving a sense of incongruity to the viewer.

In order to compensate for the defect pixel so that the first order differential values of the image signals of the defect pixel and those of the non-defect pixels adjacent to the defect pixel continue to each other, the multi-resolution conversion processing is applied to the image signals so as to acquire multi-resolution signals, and the compensation processing is applied to the acquired multi-resolution signals, and then, the multi-resolution inverse-conversion processing is applied to the compensated multi-resolution signals so as to restructure the compensated image signals.

The multiple resolution conversion is a generic name of the methods represented by the wavelet conversion, the full-restructuring filter bank, the Laplacian pyramid, etc. In this method, one converting operation allows the inputted signals to be resolved into high-frequency component signals and low-frequency component signals, and then, a same kind of converting operation is further applied to the acquired low-frequency component signals, in order to obtain the multiple resolution signals including a plurality of signals locating in frequency bands being different relative to each other. The multiple resolution signals can be restructured to the original signals by applying the multiple resolution inverse-conversion to the multiple resolution signals. The detailed explanations of such the methods are set forth in, for instance, "Wavelet and Filter banks" by G. Strang & T. Nguyen, Wellesley-Cambridge Press. The summary of the wavelet transform will be described in the following.

Figure 2:
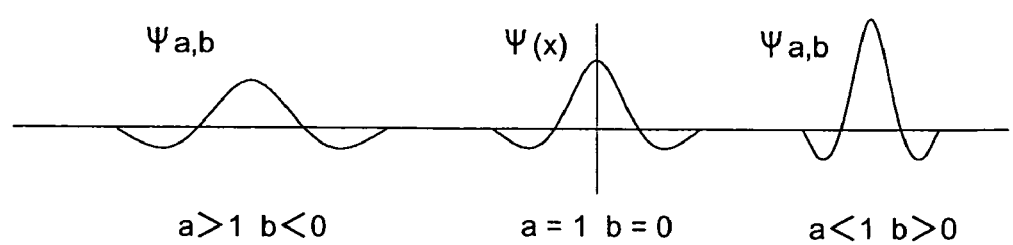
FIG. 2 shows wavelet functions employed for the multiple-resolution conversion processing of the defect detecting signals pertaining to the present invention.

The wavelet transform is operated as follows: In the first place, the following wavelet function shown in equation (1), where vibration is observed in a finite range as shown in FIG. 2, is used to obtain the wavelet transform coefficient <f, $\psi_{a,b}$> with respect to input signal f(x) by employing equation (2). Through this process, input signal is converted into the sum total of the wavelet function shown in equation (3).

[Eq. 1]
$$\psi_{a,b}(x) = \psi\left(\frac{x-b}{a}\right) \quad (1)$$

[Eq. 2]
$$\langle f, \psi_{a,b}\rangle \equiv \frac{1}{a}\int f(x)\cdot\psi\left(\frac{x-b}{a}\right)dx \quad (2)$$

[Eq. 3]
$$f(x) = \sum_{a,b}\langle f,\psi_{a,b}\rangle\cdot\psi_{a,b}(x) \quad (3)$$

In the above equation, "a" denotes the scale of the wavelet function, and "b" the position of the wavelet function. As shown in FIG. 2, as the value "a" is greater, the frequency of the wavelet function $\psi_{a,b}(x)$ is smaller. The position where the wavelet function $\psi_{a,b}(x)$ vibrates moves according to the value of position "b". Thus, equation (3) signifies that the input signal f(x) is decomposed into the sum total of the wavelet function $\psi_{a,b}(x)$ having various scales and positions.

A great number of the wavelet functions are known, that allow the above-mentioned conversion. In the field of image processing, there have been specifically well known the orthogonal wavelet conversion and the bi-orthogonal wavelet conversion, which make it possible to conduct calculations at a high-speed rate. Further, the Dyadic Wavelet transform is more desirable, compared to the orthogonal wavelet conversion or the bi-orthogonal wavelet conversion, since it is possible for the Dyadic Wavelet transform to recognize the image defect more accurately based on the defect detecting signals after the converting operation.

Next, the orthogonal wavelet conversion and the bi-orthogonal wavelet conversion will be detailed in the following. In the orthogonal wavelet conversion and the bi-orthogonal wavelet conversion, the wavelet function defined by equation (4) shown in the following is employed.

[Eq. 4]
$$\psi_{i,j}(x) = 2^{-i}\psi\left(\frac{x - j\cdot 2^i}{2^i}\right) \quad (4)$$

where "i" denotes a natural number.

Comparison between equation (4) and equation (1) shows that the value of scale "a" is defined discretely by an i-th power of "2", in the orthogonal wavelet conversion and the bi-orthogonal wavelet conversion. This value "i" is called a level.

In practical terms, level "i" is restricted up to finite upper limit N, and input signal is converted as shown in equation (5), equation (6) and equation (7).

[Eq. 5]
$$\begin{aligned}f(x) &\equiv S_0 \\ &= \sum_j \langle S_0, \psi_{1,j}\rangle\cdot\psi_{1,j}(x) + \sum_j\langle S_0,\phi_{1,j}\rangle\cdot\phi_{1,j}(x) \\ &\equiv \sum_j W_1(j)\cdot\psi_{1,j}(x) + \sum_j S_1(j)\cdot\phi_{1,j}(x)\end{aligned} \quad (5)$$

$$\begin{aligned}S_{i-1} &= \sum_j\langle S_{i-1},\psi_{i,j}\rangle\cdot\psi_{i,j}(x) + \sum_j\langle S_{i-1},\phi_{i,j}\rangle\cdot\phi_{i,j}(x) \\ &\equiv \sum_j W_1(j)\cdot\psi_{1,j}(x) + \sum_j S_1(j)\cdot\phi_{1,j}(x)\end{aligned} \quad (6)$$

$$\begin{aligned}f(x) &\equiv S_0 \\ &= \sum_{i=1}^{N}\sum_j W_1(j)\cdot\psi_{1,j}(x) + \sum_j S_N(j)\cdot\phi_{1,j}(x)\end{aligned} \quad (7)$$

The second term of equation (5) denotes that the low frequency band component of the residue that cannot be represented by the sum total of wavelet function $\psi_{1,j}(x)$ of level 1 is represented in terms of the sum total of scaling function $\phi_{1,j}(x)$. An adequate scaling function in response to the wavelet function is employed (refer to the aforementioned reference). This means that input signal f(x)≡$S_0$ is decomposed into the high frequency band component $W_1$ and low frequency band component $S_j$ of level 1 by the wavelet transform of level 1 shown in equation (5).

Incidentally, in the image signals, the high frequency band component represents fine structures, namely, sharply changing structures, in the image, for instance, like hears and lashes, while the low frequency band component represents coarse structures, namely, moderately changing structures, in the image, like cheeks.

Since the minimum traveling unit of the wavelet function $\psi_{i,j}(x)$ is $2^i$, each of the signal volume of high frequency band component $W_1$ and low frequency band component $S_1$ with respect to the signal volume of input signal "$S_o$" is ½. The sum total of the signal volumes of high frequency band component $W_1$ and low frequency band component $S_1$ is equal to the signal volume of input signal "$S_0$". The low frequency band component $S_1$, obtained by the wavelet transform of level 1, is decomposed into high frequency band component $W_2$ and low frequency band component $S_2$ of level 2 by equation (6). After that, transform is repeated up to level N, whereby input signal "$S_0$" is decomposed into the sum total of the high frequency band components of levels 1 through N and the sum of the low frequency band components of level N, as shown in equation (7).

Figure 3:
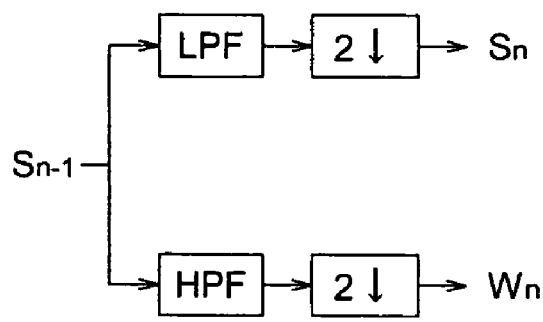
FIG. 3 shows a block diagram representing a method for calculating an orthogonal wavelet conversion or a bi-orthogonal wavelet conversion of level 1 by means of filter processing.

It has been well known that the wavelet transform of level 1, shown in equation (6), can be computed by the filtering process, which employs low-pass filter LPF and high-pass filter HPF as shown in FIG. 3 (refer to "Wavelet and Filter banks" by G. Strang & T. Nguyen, Wellesley-Cambridge Press).

As shown in FIG. 3, input signal "$S_0$" can be decomposed into the high frequency band component and the low frequency band component, which are obtained by the orthogonal wavelet conversion of level 1 or the bi-orthogonal wavelet conversion of level 1, by processing input signal "$S_0$" with low-pass filter LPF and high-pass filter HPF and by thinning out input signal "$S_0$" at every other samples. Incidentally, in FIG. 3, symbol 2↓ shows the down sampling where every other samples are removed (thinned out).

The filter coefficients of low-pass filter LPF and high-pass filter HPF to be employed for the processing are appropriately determined corresponding to the wavelet function (refer to the reference document mentioned above).

Figure 4:
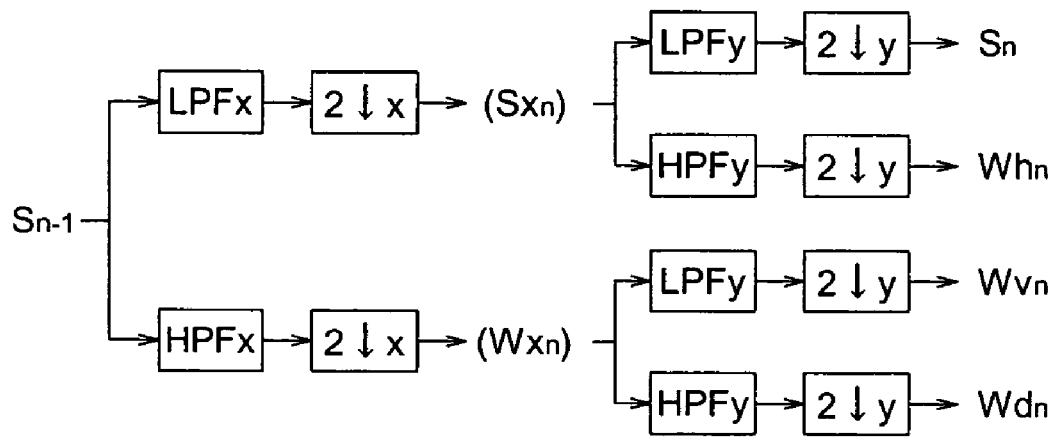
FIG. 4 shows a block diagram representing a method for calculating an orthogonal wavelet conversion or a bi-orthogonal wavelet conversion of level 1 in two-dimensional signals by means of filter processing.

The wavelet transform of level 1 for the two-dimensional signals, such as the defect detecting signals and the image signals, is conducted in the filtering process as shown in FIG. 4. Initially, the filter processing is applied to input signal $S_{n-1}$ by means of low-pass filter $LPF_x$, and high-pass filter $HPF_x$ in the direction of "x", and then, the down sampling is conducted in the direction of "x". By conducting such the processing, input signal $S_{n-1}$ is decomposed into low frequency band component $SX_n$ and high frequency band component $WX_n$. Further, the filter processing is applied to low frequency band component $SX_n$, and high frequency band component $WX_n$ by means of low-pass filter $LPF_y$, and high-pass filter $HPF_y$ in the direction of "y", and then, the down sampling is conducted in the direction of "y".

According to the filtering process mentioned above, input signal $S_{n-1}$ can be decomposed into three high frequency band components $Wv_n$, $Wh_n$, $Wd_n$ and one low frequency band component $S_n$. Since each of the signal volumes of $Wv_n$, $Wh_n$, $Wd_n$ and $S_n$, generated by a single wavelet transform operation, is ½ of that of the input signal $S_{n-1}$ prior to decomposition in both vertical and horizontal directions, the total sum of signal volumes of four components subsequent to decomposition is equal to the signal $S_{n-1}$ prior to decomposition.

Incidentally, the suffix "x", subscripted as $LPF_x$, $HPF_x$ and $2\downarrow_x$ as shown in FIG. 4, indicates the processing in the direction of "x", while the suffix "y", subscripted as $LPF_y$, $HPF_y$ and $2\downarrow_y$ as shown in FIG. 3, indicates the processing in the direction of "y".

Figure 5:
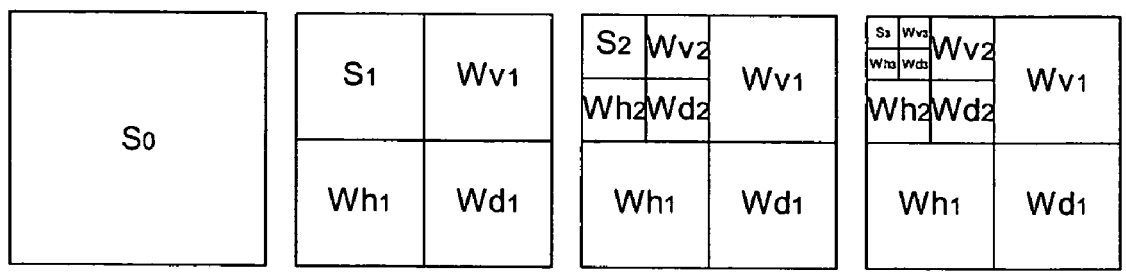
FIG. 5 shows a schematic diagram representing a process of decomposing input signals by means of the wavelet transform of level 1, level 2 and level 3.

FIG. 5 shows the type process of decomposing input signal "$S_0$" by means of the wavelet transform of level 1, level 2 and level 3. As the level number "i" increases, the image signal is further thinned out by the down sampling operation, and the decomposed image is getting small.

Figure 6:
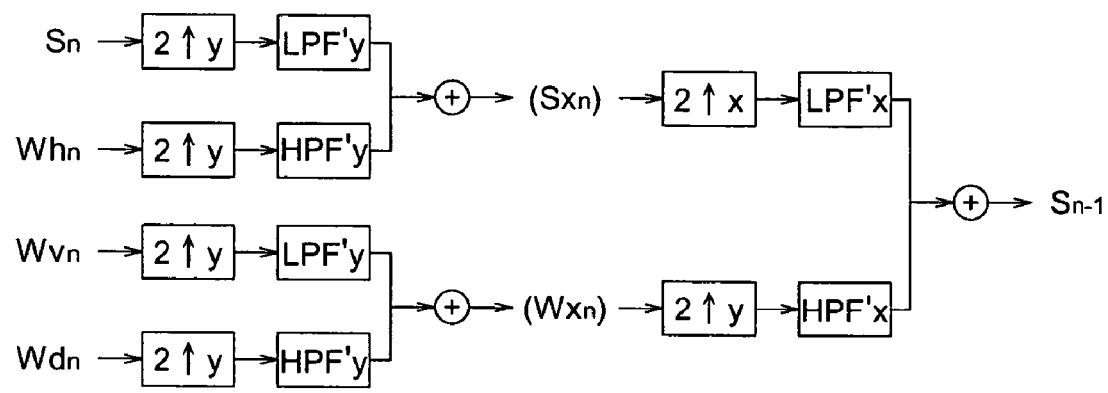
FIG. 6 shows a block diagram representing a method for reconstructing input signals "$S_{n-1}$", decomposed by an orthogonal wavelet conversion or a bi-orthogonal wavelet conversion, by applying a wavelet inverse-transform by means of filter processing.

Further, it has been well known that, by applying the wavelet inverse transform, which would be calculated in the filtering process, or the like, to $Wv_n$, $Wh_n$, $Wd_n$ and $S_n$ generated by decomposition processing, the signal $S_{n-1}$ prior to decomposition can be fully reconstructed as shown in FIG. 6. Incidentally, in FIG. 6, LPF' indicates a low-pass filter for inverse transform, while HPF' indicates a high-pass filter for inverse transform. Further, $2\uparrow$ denotes the up-sampling where zero is inserted into every other signals. Still further, the suffix "x", subscripted as $LPF'_x$, $HPF'_x$ and $2\uparrow_x$, indicates the processing in the direction of "x", while the suffix "y", subscripted as $LPF'_y$, $HPF'_y$ and $2\uparrow_y$, indicates the processing in the direction of "y".

As shown in FIG. 6, low frequency band component $SX_n$ can be obtained by adding a signal, which is acquired by up-sampling $S_n$ in the direction of "y" and processing with low-pass filter $LPF'_y$ in the direction of "y", and another signal, which is acquired by up-sampling $Wh_n$, in the direction of "y" and processing with high-pass filter $HPF'_y$ in the direction of "y", to each other. As well as the above process, $WX_n$ is generated from $Wv_n$ and $Wd_n$.

Further, the signal $S_{n-1}$ prior to decomposition can be reconstructed by adding a signal, which is acquired by up-sampling $SX_n$ in the direction of "x" and processing with low-pass filter $LPF'_x$ in the direction of "x", and another signal, which is acquired by up-sampling $WX_n$ in the direction of "x" and processing with high-pass filter $HPF'_x$ in the direction of "x", to each other.

In case of the orthogonal wavelet conversion, the coefficient of the filter employed for the inverse transforming operation is the same as that of the filter employed for the transforming operation. On the other hand, in case of the bi-orthogonal wavelet conversion, the coefficient of the filter employed for the inverse transforming operation is different from that of the filter employed for the transforming operation (refer to the aforementioned reference document).

When the defect pixel is compensated for with respect to each of the high frequency band component and the low frequency band component by applying the multi-resolution conversion processing according to the abovementioned method, it is applicable that compensation processing methods, which are either similar or different to each other, are respectively applied to the defect pixels in both components.

An interpolation processing method based on the signal intensities of non-defect signals adjacent to the defect pixel can be cited as a concrete method for compensating for the high frequency band component of the defect pixel. An interpolation processing method similar to the above can be employed as a concrete method for compensating for the low frequency band component of the defect pixel.

Since it is possible to compensate for the defect pixel so that first order differential values of the visible light image signals of the defect pixel and those of the non-defect pixels adjacent to the defect pixel continue to each other, by restructuring the image signals through the process of the multi-resolution inverse-conversion after compensating for a part corresponding to the defect pixel of each frequency band component, it becomes possible to obtain the compensated image as a natural image without generating discontinuity, which yields slight unevenness in the image.

As mentioned in the foregoing, it is desirable that the Dyadic Wavelet transform is employed as the multi-resolution conversion processing, when applying it to the image signals. Incidentally, detailed explanations in regard to the Dyadic Wavelet transform are set forth in "Singularity detection and processing with wavelets" by S. Mallat and W. L. Hwang, IEEE Trans. Inform. Theory 38 617 (1992), "Characterization of signal from multiscale edges" by S. Mallet and S. Zhong, IEEE Trans. Pattern Anal. Machine Intel. 14 710 (1992), and "A wavelet tour of signal processing 2ed." by S. Mallat, Academic Press.

The wavelet function employed in the Dyadic Wavelet transform is defined by equation (8) shown below.

[Eq. 8]

$$\psi_{i,j}(x) = 2^{-i}\psi\left(\frac{x-j}{2^i}\right) \quad (8)$$

where "i" denotes a natural number.

The Wavelet functions of the orthogonal wavelet transform and the bi-orthogonal wavelet transform are discretely defined when the minimum traveling unit of the position on level "i" is $2^i$, as described above. By contrast, in the Dyadic Wavelet transform, the minimum traveling unit of the position is kept constant, regardless of level "i".

In other words, in the Dyadic Wavelet transform, since "i" does not appear at the position of the wavelet function indicated by "b" in equation (1), for instance, like $2^i$, the minimum traveling unit of the position is always kept constant, regardless of its level number. Accordingly, unlike the orthogonal wavelet transform and the bi-orthogonal wavelet transform, the down-sampling operation at the time of calculation in the filtering process is not required for the Dyadic Wavelet transform. Due to this difference, the Dyadic Wavelet transform has the following characteristics.

Characteristic 1: The signal volume of each of high frequency band component $W_i$ and low frequency band component $S_i$ generated by the Dyadic Wavelet transform of level 1 shown by equation (9) is the same as that of signal $S_{i-1}$ prior to transform.

[Eq. 9]

$$S_{i-1} = \sum_j \langle S_{i-1}, \psi_{i,j} \rangle \cdot \psi_{i,j}(x) + \sum_j \langle S_{i-1}, \phi_{i,j} \rangle \cdot \phi_{i,j}(x)$$
$$\equiv \sum_j W_i(j) \cdot \psi_{i,j}(x) + \sum_j S_i(j) \cdot \phi_{i,j}(x)$$
(9)

Characteristic 2: The scaling function $\phi_{i,j}(x)$ and the wavelet function $\psi_{i,j}(x)$ fulfill the following relationship shown by equation (10).

[Eq. 10]

$$\psi_{i,j}(x) = \frac{\partial}{\partial x} \phi_{i,j}(x)$$
(10)

Thus, the high frequency band component $W_i$ generated by the Dyadic Wavelet transform of level 1 represents the first differential (gradient) of the low frequency band component $S_i$.

Characteristic 3: With respect to $W_i \cdot \gamma_i$ (hereinafter referred to as "compensated high frequency band component) obtained by multiplying the coefficient $\gamma_i$ (refer to the aforementioned reference documents in regard to the Dyadic Wavelet transform) determined in response to the level "i" of the Wavelet transform, by high frequency band component, the relationship between levels of the signal intensities of compensated high frequency band components $W_i \cdot \gamma_i$ subsequent to the above-mentioned transform obeys a certain rule, in response to the singularity of the changes of input signals, as described in the following.

Figure 7:
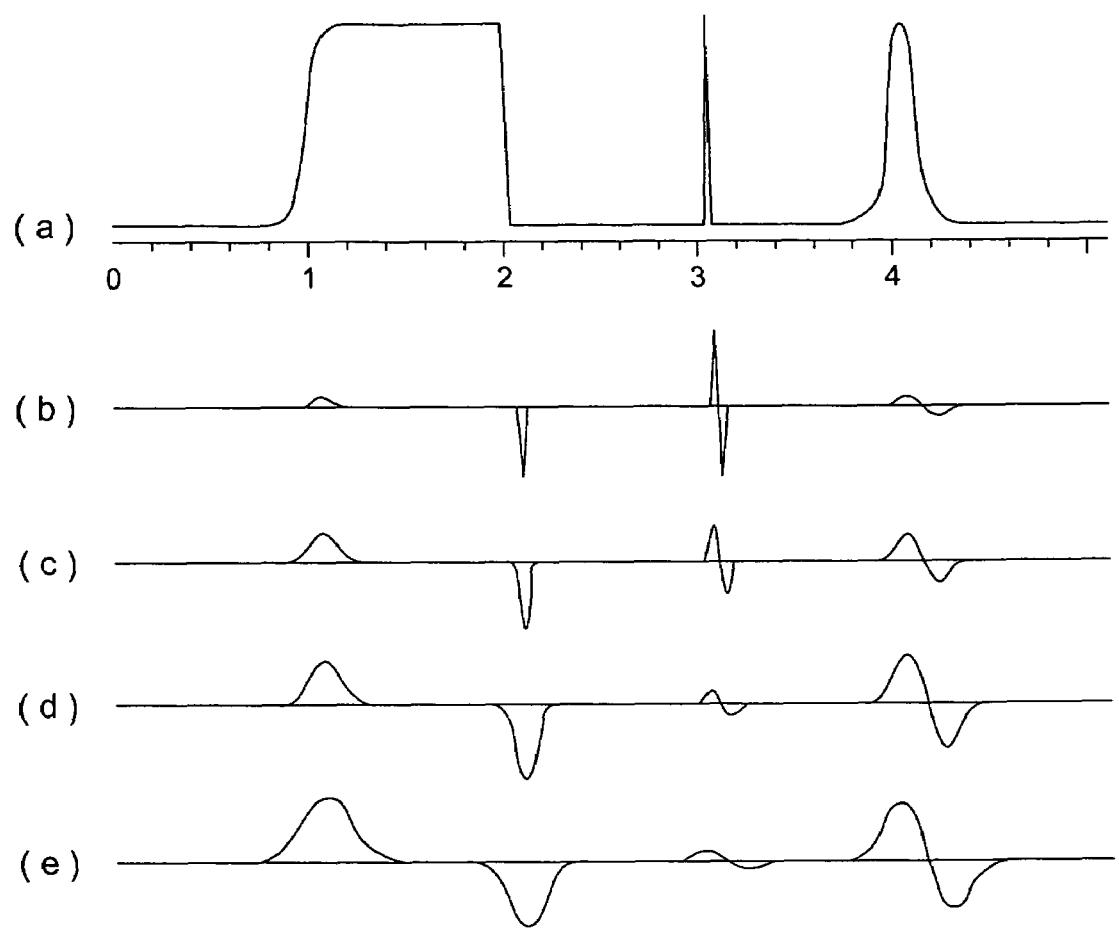
FIG. 7 shows exemplified waveforms of input signal "$S_0$" and high frequency band components, each acquired by the Dyadic Wavelet transform of each level.

FIG. 7 shows exemplified waveforms of: input signal "$S_0$" at line (a); compensated high frequency band component $W_1 \cdot \gamma_1$, acquired by the Dyadic Wavelet transform of level 1, at line (b); compensated high frequency band component $W_2 \cdot \gamma_2$, acquired by the Dyadic Wavelet transform of level 2, at line (c); compensated high frequency band component $W_3 \cdot \gamma_3$, acquired by the Dyadic Wavelet transform of level 3, at line (d); and compensated high frequency band component $W_4 \cdot \gamma_4$, acquired by the Dyadic Wavelet transform of level 4, at line (e).

Observing the changes of the signal intensities step by step, the signal intensity of the compensated high frequency band component $W_i \cdot \gamma_i$, corresponding to a gradual change of the signal intensity shown at "1" and "4" of line (a), increases according as the level number "i" increases, as shown in line (b) through line (e).

With respect to input signal "$S_0$", the signal intensity of the compensated high frequency band component $W_i \cdot \gamma_i$, corresponding to a stepwise signal change shown at "2" of line (a), is kept constant irrespective of the level number "i". Further, with respect to input signal "$S_0$", the signal intensity of the compensated high frequency band component $W_i \cdot \gamma_i$, corresponding to a signal change of δ-function shown at "3" of line (a), decreases according as the level number "i" increases, as shown in line (b) through line (e).

Figure 8:
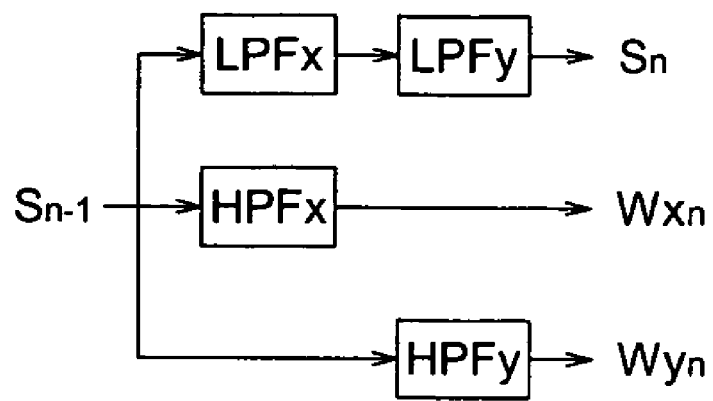
FIG. 8 shows a block diagram representing a method for calculating the Dyadic Wavelet transform of level 1 by means of filter processing.

Characteristic 4: Unlike the above-mentioned method of the orthogonal wavelet transform and the bi-orthogonal wavelet transform, the method of Dyadic Wavelet transform of level 1 in respect to the two-dimensional signals such as the defect detecting signals is followed as shown in FIG. 8. As shown in FIG. 8, in the Dyadic Wavelet transform of level 1, low frequency band component $S_n$ can be acquired by processing input signal $S_{n-1}$ with low-pass filter $LPF_x$, in the direction of "x" and low-pass filter $LPF_y$ in the direction of "y". Further, a high frequency band component $Wx_n$ can be acquired by processing input signal $S_{n-1}$ with high-pass filter $HPF_x$, in the direction of "x", while another high frequency band component $Wy_n$ can be acquired by processing input signal $S_{n-1}$ with high-pass filter $HPF_y$, in the direction of "y".

The low frequency band component $S_{n-1}$ is decomposed into two high frequency band components $WX_n$, $Wy_n$ and one low frequency band component $S_n$ by the Dyadic Wavelet transform of level 1. Two high frequency band components correspond to components x and y of the change vector $V_n$ in the two dimensions of the low frequency band component $S_n$. The magnitude $M_n$ of the change vector $V_n$ and angle of deflection $A_n$ are given by equation (11) and equation (12) shown as follow.

[Eq. 11]

$$M_n = \sqrt{Wx_n^2 + Wy_n^2}$$
(11)

$$A_n = \text{argument}(Wx_n + iWy_n)$$
(12)

$S_{n-1}$ prior to transform can be reconfigured when the Dyadic Wavelet inverse transform shown in FIG. 8 is applied to two high frequency band components $WX_n$, $Wy_n$ and one low frequency band component $S_n$. In other words, input signal $S_{n-1}$ prior to transform can be reconstructed by adding the signals of: the signal acquired by processing low frequency band component $S_n$ with low-pass filters $LPF_x$ and $LPF_y$, both used for the forward transform in the directions of "x" and "y"; the signal acquired by processing high frequency band component $Wx_n$ with high-pass filter $HPF'_x$ for inverse transform in the direction of "x" and low-pass filter $LPF'_y$ for inverse transform in the direction of "y"; and the signal acquired by processing high frequency band component $Wy_n$, with low-pass filter $LPF'_x$ for inverse transform in the direction of "x" and high-pass filter $HPF'_y$ for inverse transform in the direction of "y"; together.

Figure 10:
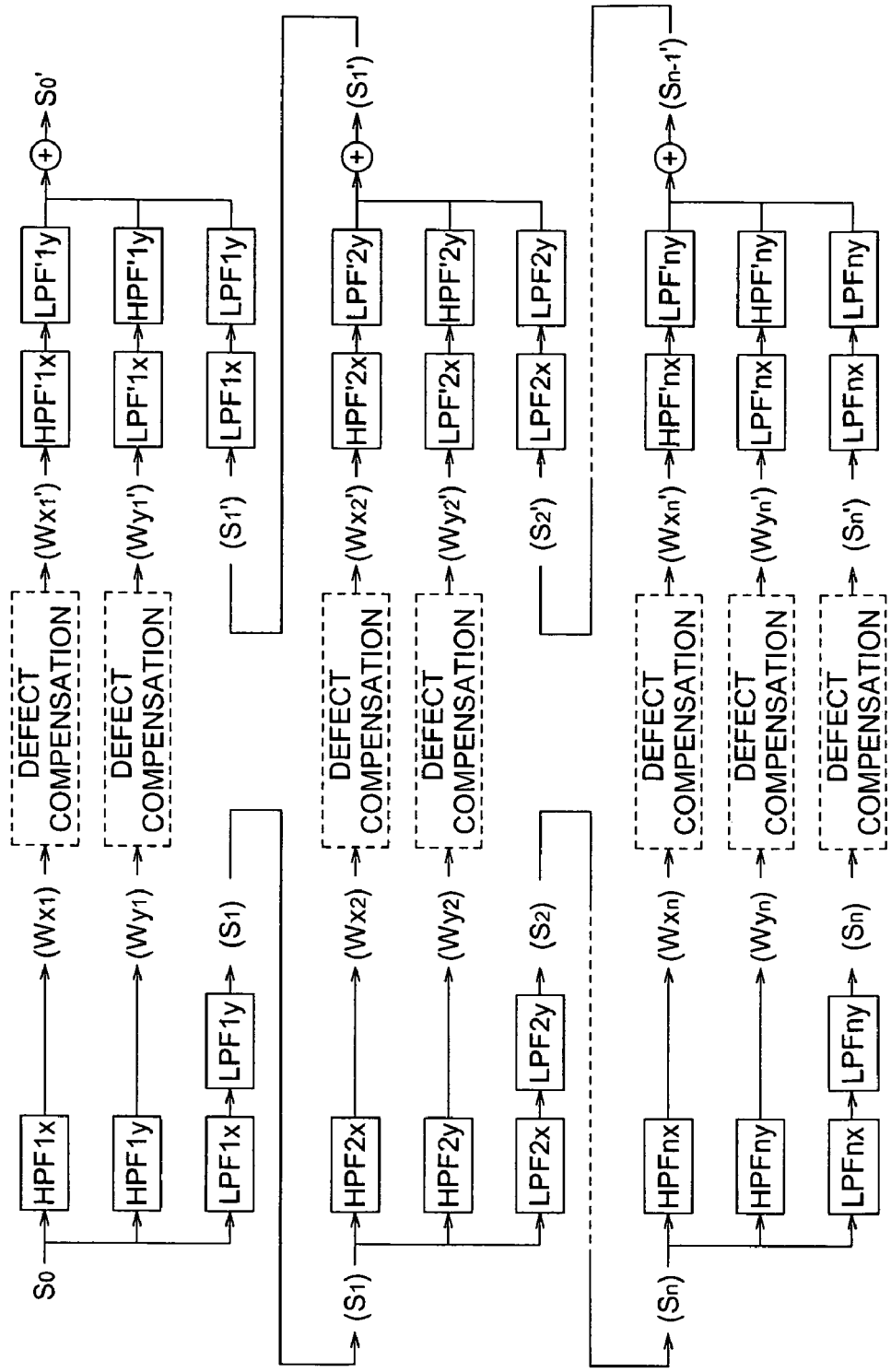
FIG. 10 shows a block diagram representing a method for compensating for the image signals by performing the Dyadic Wavelet transform of level "n" in two-dimensional signals by means of filter processing.

Next, referring to FIG. 10, the method for acquiring compensated image signals $S_0'$, which are compensated for in such a manner that the first order differential values of the image signals of the defect pixel and those of the non-defect pixels adjacent to the defect pixel continue to each other, will be detailed in the following. The method includes the steps of applying the Dyadic Wavelet transform of level N to the defect detecting signal $S_0$ (input signal), conducting compensation processing with respect to the defect pixel of each of the acquired signals and applying the multi-resolution inverse-conversion to the processed signals so as to generate compensated image signals $S_0'$.

In the Dyadic Wavelet transform of level 1 for input signal "$S_0$", input signal "$S_0$" is decomposed into two high frequency band components $Wx_1$, $Wy_1$ and low frequency band component $S_1$ by the same filtering process as that shown in FIG. 8. In the Dyadic Wavelet transform of level 2, low frequency band component $S_1$ is further decomposed into two high frequency band components $Wx_2$, $Wy_2$ and low frequency band component $S_2$ by the same filtering process. By repeating the abovementioned operational processing up to level N, input signal "$S_0$" is decomposed into a plurality of high frequency band components $Wx_1$, $Wx_2$, ... $WX_n$, $Wy_1$, $Wy_2$, ... $WY_n$ and a single low frequency band component $S_n$.

Further, compensation processing is applied to each of the high frequency band components and the low frequency band component corresponding to the defect pixel, and then the multi-resolution inverse-conversion is performed.

Figure 9:
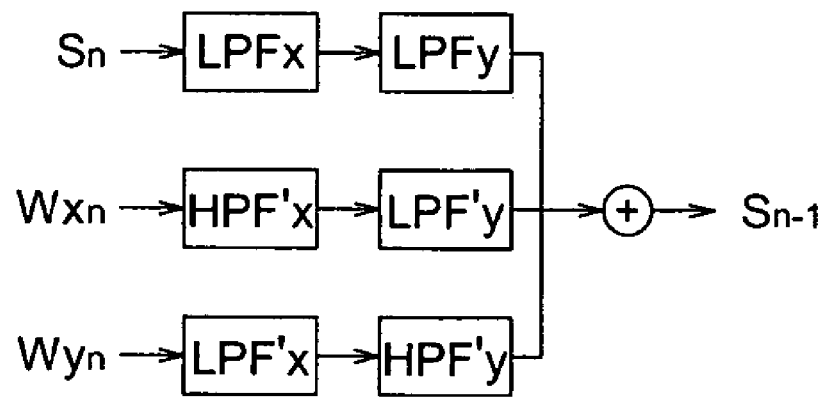
FIG. 9 shows a block diagram representing a method for calculating the Dyadic Wavelet transform of level 1 in two-dimensional signals by means of filter processing.

The multi-resolution inverse-conversion is performed according to the procedure shown in FIG. 9. Concretely speaking, the compensated low frequency band component $S_{n-1}'$ of level (N−1) is restructured from the two compensated high frequency band components $Wx_n'$, $Wy_n'$ of level N and the compensated low frequency band component $S_n'$ of level N. By repeating this operation shown in FIG. 9, the compensated low frequency band component $S_1'$ of level 1 is restructured from the two compensated high frequency band components $Wx_2'$, $Wy_2'$ of level 2 and the compensated low frequency band component $S_2'$, of level 2. Successively, the compensated low frequency band component $S_0'$ is restructured from the two compensated high frequency band components $Wx_1'$, $Wy_1'$ of level 1 and the compensated low frequency band component $S_1'$ of level 1.

The filter coefficients of the filters employed for the processing are appropriately determined corresponding to the wavelet functions. Further, in the Dyadic Wavelet transform, the filter coefficients, employed for every level number, are different relative to each other. The filtering coefficients employed for level "n" are created by inserting $2^{n-1}-1$ zeros into each interval between filtering coefficients for level 1. The abovementioned procedure is set forth in the aforementioned reference document.

Incidentally, to compensate for the defect pixel with respect to the low frequency band component and the high frequency band components of each level acquired by the Dyadic Wavelet transform, the interpolation processing, based on the signal intensities of non-defect pixels adjacent to the defect pixel, can be employed for such the compensation processing, as well as in the case of the orthogonal wavelet transform or the bi-orthogonal wavelet transform. Further, it is also applicable that, with respect to the high frequency band components, the compensation processing is conducted so as to interpolate the phases of the high frequency band components.

As described in the foregoing, unlike the orthogonal wavelet transform or the bi-orthogonal wavelet transform, the Dyadic Wavelet transform does not require the downsampling operation when converting the image signals. Accordingly, it becomes possible to conduct the compensation processing of the defect pixel in more detail than ever, without thinning out the defect pixel itself and/or the non-defect pixels adjacent to the defect pixel. As a result, discontinuities in the compensated image, which might be perceived as a slight unevenness in the image by the viewer, could not be generated. Therefore, even for an image having fine structures such as a close-up image of human face, it becomes possible to compensate for the image so as to obtain a natural image without spoiling the expression of the face or the feel of its material.

Incidentally, to accurately recognize the defect pixel when compensating for the defect pixel in the image signals, it is desirable that the multi-resolution conversion processing is applied to the defect detecting signals, in order to determine the presence or absence of the defect pixel based on the converted signals.

As conventionally performed, it is possible to recognize the defect pixel by comparing the defect detecting signals, acquired by scanning the image recorded on the recording medium with the infrared light, with a threshold value established in advance. The defect detecting signals acquired by the abovementioned method, however, includes noises generated at the time of photoelectronic conversion by the CCD sensor, or at the time of amplifying the signals. Accordingly, there has been a fear that each of pixels to be determined originally as defect pixels is not necessary recognized as the defect pixel, depending on the established threshold value.

On the contrary to the above, since the high frequency band components, acquired by applying the multi-resolution conversion processing to the defect detecting signals, include little noise in the form of signal intensity, it is possible to accurately recognize the defect pixel. Further, by recognizing the defect pixel in a multi-resolution space and by compensating for the image signal corresponding to the recognized defect pixel in the same multi-resolution space, it becomes possible to make the compensated image having more natural impression than ever.

Figure 11:
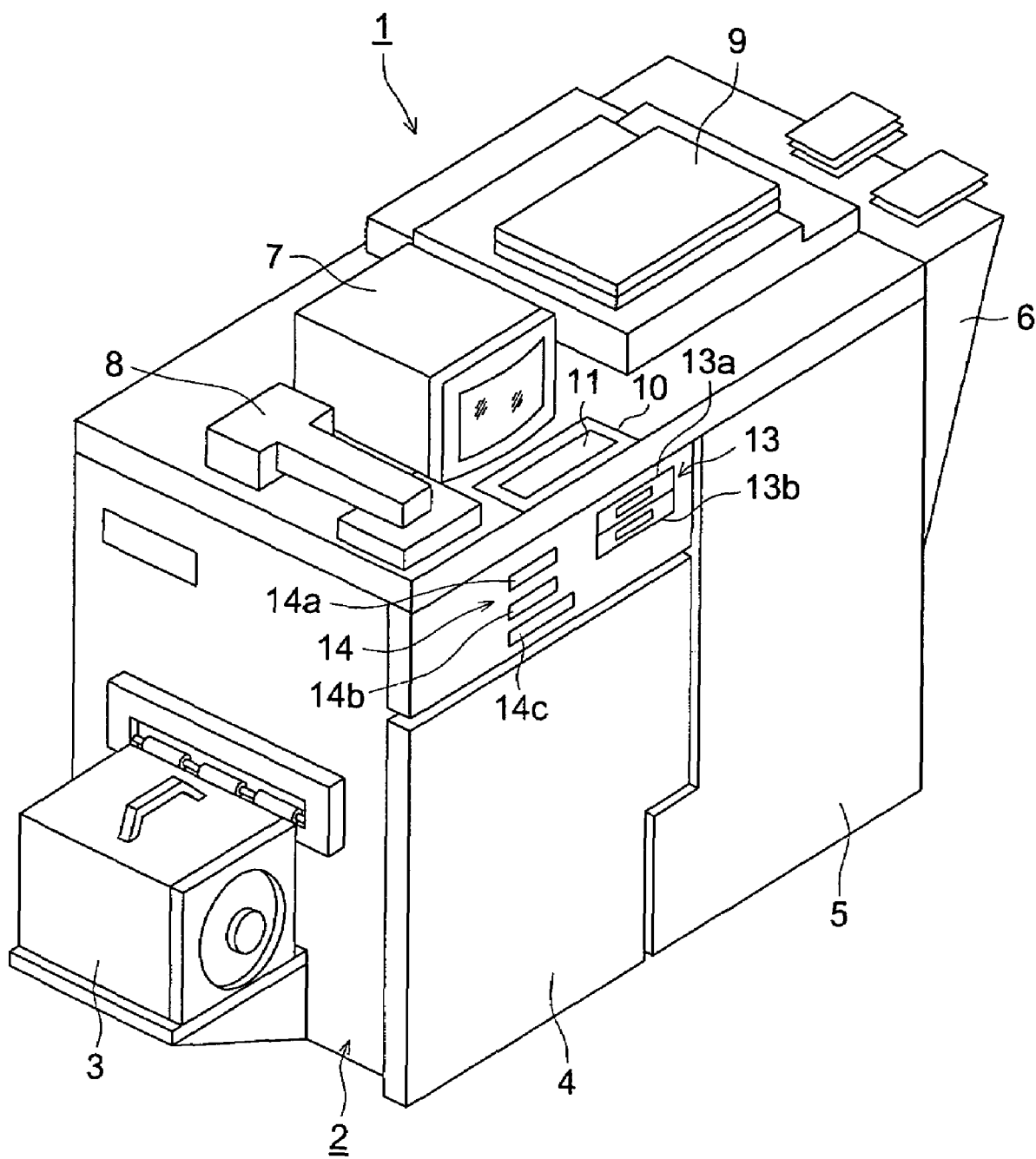
FIG. 11 shows an exemplified outlook configuration of an image-recording apparatus embodied in the present invention.

As the next step, an image-recording apparatus provided with an image-processing section (image-processing apparatus), which compensates for the defect pixel of the image signals in a manner as described in the foregoing, will be detailed in the following. FIG. 11 shows an exemplified outlook configuration of image-recording apparatus 1 embodied in the present invention.

Figure 12:
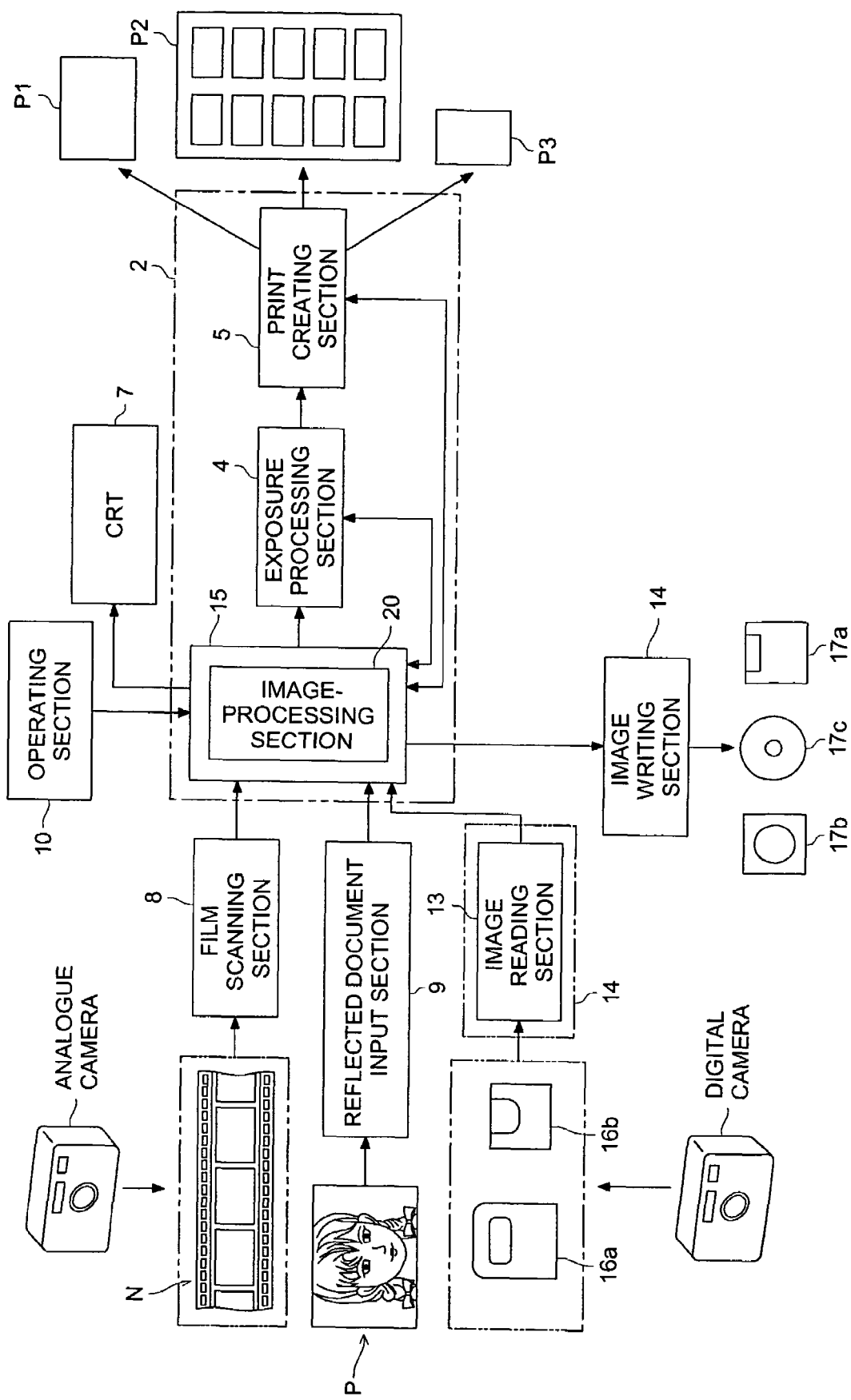
FIG. 12 shows a block diagram representing a functional configuration of an image-recording apparatus shown in FIG. 11.

As shown in FIG. 11, image-recording apparatus 1 is provided with magazine loading section 3 mounted on a side of housing body 2, exposure processing section 4 mounted inside housing body 2 and print creating section 5. Further, tray 6 for receiving ejected prints is installed on another side of housing body 2. Still further, CRT 7 (Cathode Ray Tube 7) serving as a display device, film scanning section 8, reflected document input section 9 and operating section 10 are provided on the upper side of housing body 2. Operating section 10 includes inputting means 11 constituted by a touch panel, etc. Still further, image reading section 13 being capable of reading image information stored in various kinds of digital recording mediums including the floppy (Registered Trade Mark) disk, etc. and image writing section 14 being capable of writing (outputting) image signals into various kinds of digital recording mediums including the floppy (Registered Trade Mark) disk, etc. are installed in housing body 2. Still further, as shown in FIG. 12, control section 15 for intensively controlling the abovementioned sections is also installed in housing body 2.

The photosensitive material serving as an image outputting medium is loaded in magazine loading section 3. The photosensitive material is made of, for instance, a silver-halide photosensitive paper including silver-halide photosensitive heat-developing materials. The photosensitive materials having various sizes, such as service size, high-vision size, panorama size, A4-size, visiting card size, etc. can be loaded into magazine loading section 3. Under the command signals sent from control section 15, a conveying means (not shown in the drawings) takes out the photosensitive material having a predetermined size from magazine loading section 3 to convey it to exposure processing section 4.

Exposure processing section 4 exposes the photosensitive material based on the image signals to form a latent image on the photosensitive material. After the exposure processing is completed, the photosensitive material is conveyed to print creating section 5. Corresponding to the size of the photosensitive material, the prints having various kinds of sizes, such as service size prints, high-vision size prints, prints P1 of panorama size, etc., prints P2 of A4-size, prints P3 of visiting card size, etc. are created as shown in FIG. 12.

Print creating section 5 conducts developing and drying operations for the conveyed photosensitive material to create prints. Then, the created prints are ejected onto tray 6.

Incidentally, although image-recording apparatus 1, in which the conveyed photosensitive material is developed and dried to create the prints, is exemplified in FIG. 11, the scope of the present invention is not limited to the above. An apparatus employing any kind of methods, including, for instance, an ink-jetting method, an electro-photographic method, a heat-sensitive method and a sublimation method, is also applicable in the present invention, as far as the apparatus forms an image based on image signals.

CRT 7 displays the processed image, the contents of the operation, etc. according to the command signals sent from control section 15. Incidentally, the scope of the display device is not limited to the CRT, but a liquid-crystal display, a plasma display panel, etc. are also applicable in the present invention.

As shown in FIG. 12, film scanning section 8 reads the image and the defect of transparent recording medium N, such as a negative film, a reversal film, etc., on which an image captured by an analogue camera, etc. is developed, and for this purpose, provided with a film scanner.

The image-reading light source, the defect detecting light source, the scanning means for scanning the image-reading light and the defect detecting light emitted from such the light sources, the light converging means for converging the image-reading light and the defect detecting light penetrated through transparent recording medium N, photoelectronic converting element such as the CCD sensor, etc. constitute the film scanner.

In the film scanner, the image-reading light and the defect detecting light are scanned on transparent recording medium N, and the lights penetrated through transparent recording medium N are converged and focused onto the photoelectronic converting element by means of the light converging means, in order to acquire the image signals and the defect detecting signal as electronic signals photoelectronically converted by the photoelectronic converting element. The acquired image signals and the defect detecting signal are transferred to control section 15.

Reflected document input section 9 reads the image and the defect of non-transparent recording medium P, such as a silver-halide printing paper, a color paper, etc., on which an image captured by an analogue camera, etc. is developed (outputted), and for this purpose, provided with a flat bed scanner.

The image-reading light source, the defect detecting light source, the scanning means, the light converging means, the CCD sensor, etc. constitute the flat bed scanner, as well as film scanning section 8.

In reflected document input section 9, the image-reading light and the defect detecting light are scanned on non-transparent recording medium P, and the lights reflected from the recording medium are converged and focused onto the CCD sensor by means of the light converging means, in order to acquire the image signals and the defect detecting signal photoelectronically converted by the CCD sensor. The acquired image signals and the defect detecting signal are transferred to control section 15.

In film scanning section 8 and reflected document input section 9, three visible lights of R, G, B are employed as the image-reading lights to acquire respective image signals of R, G, B.

Further, in film scanning section 8 and reflected document input section 9, an infrared light is employed as the defect detecting light. It is applicable that a certain threshold value for recognizing the defect pixel is established in advance, to determine the presence or absence of the defect pixel by comparing the signal intensity of the defect detecting signal with the established threshold value. Or, it is also applicable that the multi-resolution conversion processing is applied to the defect detecting signals in the manner described in the above, to determine the presence or absence of the defect pixel based on the acquired high frequency band components.

Image reading section 13 inputs frame image information, in regard to images captured by the digital camera, etc., into image-recording apparatus 1 through various kinds of digital storage mediums 16a, 16b.

Image reading section 13 is provided with PC card adaptor 13a, floppy (Registered Trade Mark) disc adaptor 13b to read the frame image information stored in them and to transfer the acquired image information to control section 15. Incidentally, for instance, the PC card reader or the PC card slot is employed as PC card adaptor 13a.

As well as the image signals inputted from film scanning section 8 or reflected document input section 9, an image-processing is applied to the image signals, read and inputted from image reading section 13, as needed, so that the processed image signals can be outputted onto the photosensitive material, etc.

Further, in image-recording apparatus 1, an image-processing, etc. are applied to the frame image information inputted from film scanning section 8, reflected document input section 9 and image reading section 13, and then, the processed image can be outputted onto not only the photosensitive material or CRT 7, but also various kinds of outputting mediums 17a, 17b, 17c.

Image writing section 14 is provided with a floppy (Registered Trade Mark) disk adaptor 14a, a MO adaptor 14b and an optical disk adaptor 14c. Accordingly, a floppy (Registered Trade Mark) disk 17a, a MO (Magneto-Optics type storage device) disk 17b and an optical disk 17c, etc. can be employed as outputting mediums.

Figure 13:
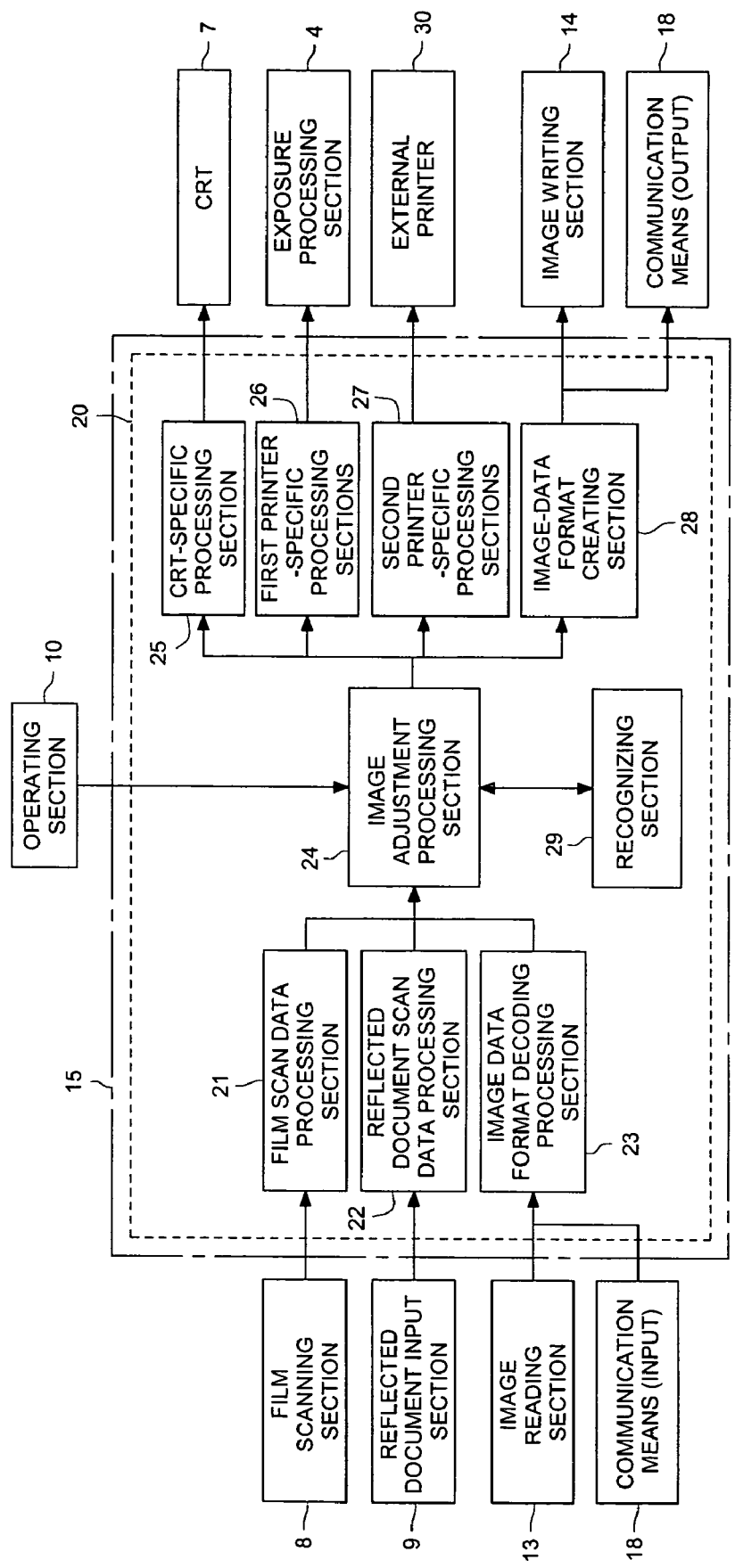
FIG. 13 shows a block diagram representing a functional configuration of an image-processing section shown in FIG. 11.

Further, as shown in FIG. 13, control section 15 is provided with communication means 18, which makes it possible to work as a network printer, so to speak, having a function for directly receiving the image signals, representing the captured image, and printing commands from another computer through a communication network, such as LAN, WAN, Internet, etc. It is also possible to transmit the image signals, representing the captured image to which the image processing of the present invention is already applied, and the associated order information to a computer located at a remote site through another computer in the facility concerned and the Internet, etc.

Next, control section 15 will be detailed in the following. Control section 15 is provided with image-processing section 20, in which the presence or absence of the defect pixel is recognized by a CPU (not shown in the drawings) cooperated with various controlling programs including a defect determining program, an image-processing program, etc., stored in the storage device, such as ROM (not shown in the drawings), etc. When the CPU recognizes the presence of the defect pixel, the multi-resolution conversion processing is applied to the image signals, and then, the compensation processing is respectively applied to the high frequency band components and the low frequency band component to generate the compensated image signals, based on which the reproduced image is outputted onto the outputting medium.

As shown in FIG. 13, image-processing section 20 is provided with film scan data processing section 21, reflected document scan data processing section 22, image data format decoding processing section 23, image adjustment processing section 24, CRT-specific processing section 25, first printer-specific processing sections 26, second printer-specific processing sections 27, image-data format creating section 28 and recognizing section 29 for recognizing the presence or absence of the defect pixel based on the defect detecting signals.

In film scan data processing section 21, various kinds of processing, such as calibrating operations inherent to film scanning section 8, a negative-to-positive inversion in case of negative document, a gray balance adjustment, a contrast adjustment, etc., are applied to the image signals inputted from film scanning section 8, and then, processed image signals are transmitted to image adjustment processing section 24. A film size and a type of negative/positive, as well as an ISO sensitivity, a manufacturer's name, information on the main subject and information on photographic conditions (for example, information described in APS), optically or magnetically recorded on the film, are also transmitted sent to the image adjustment processing section 24.

In reflected document scan data processing section 22, the calibrating operations inherent to reflected document input section 9, the negative-to-positive inversion in case of negative document, the gray balance adjustment, the contrast adjustment, etc., are applied to the image signals inputted from reflected document input section 9 and then, processed image signals are transmitted to image adjustment processing section 24.

Image data format decoding processing section 23 decodes the image data format of the image signals inputted from image reading section 13 or communication means 18, so as to convert the image signals to a data format suitable for the calculating operations in image adjustment processing section 24 by performing a converting operation of the method for reproducing the compressed code or representing color signals, etc., according to the decoded data format, as needed, and then, transmits converted image signals to image adjustment processing section 24.

Under the command signals sent from operating section 10 or control section 15, when the image signals received from film scanning section 8 or reflected document input section 9 include the defect pixel, judging from the recognized result made by recognizing section 29, image adjustment processing section 24 conducts the compensation processing for the defect pixel to transmit the processed image signals to CRT-specific processing section 25, first printer-specific processing sections 26, second printer-specific processing sections 27 and image-data format creating section 28.

Incidentally, when the image signals sent from image reading section 13 or communication means 18 include the defect detecting signal, image adjustment processing section 24 conducts the processing for compensating for the signal intensity of the defect pixel concerned, based on the recognized result made by recognizing section 29, as well.

CRT-specific processing section 25 applies a pixel number changing processing, a color matching processing, etc. to the compensated image signals received from image adjustment processing section 24, as needed, and then, transmits display signals synthesized with information necessary for displaying, such as control information, etc., to CRT 7.

First printer-specific processing sections 26 applies a calibrating processing inherent to exposure processing section 4, a color matching processing, a pixel number changing processing, etc. to the compensated image signals received from image adjustment processing section 24, as needed, and then, transmits processed image signals to exposure processing section 4.

In case that external printing apparatus 30, such as a large-sized printing apparatus, etc., is coupled to image-recording apparatus 1 embodied in the present invention, a printer-specific processing section, such as second printer-specific processing sections 27 shown in FIG. 13, is provided for every apparatus, so as to conduct an appropriate calibrating processing for each specific printer, a color matching processing, a pixel number change processing, etc.

In image-data format creating section 28, the format of the image signals received from image adjustment processing section 24 are converted to one of various kinds of general-purpose image formats, represented by JPEG (Joint Photographic Coding Experts Group), TIFF (Tagged Image File Format), Exif (Exchangeable Image File Format), etc., as needed, and then, the converted image signals are transmitted to image writing section 14 or communication means 18.

Recognizing section 29 recognizes the presence or absence of the defect pixel based on the defect detecting signals received from film scanning section 8 or reflected document input section 9. It is applicable that the presence or absence of the defect pixel is recognized by comparing the defect detecting signal with the threshold value. Alternatively, it is also applicable that the multi-resolution conversion processing is applied to the defect detecting signals in image adjustment processing section 24 to recognize the presence or absence of the defect pixel based on the acquired high frequency band components.

The aforementioned sections, such as film scan data processing section 21, reflected document scan data processing section 22, image data format decoding processing section 23, image adjustment processing section 24, CRT-specific processing section 25, first printer-specific processing sections 26, second printer-specific processing sections 27 and image-data format creating section 28, are eventually established for helping the understandings of the functions of image-processing section 20 embodied in the present invention. Accordingly, it is needless to say that each of these sections is not necessary established as a physically independent device, but is possibly established as a kind of software processing section with respect to a single CPU (Central Processing Unit).

As a next step, with respect to the compensation processing for the defect pixel of the image signals, which is conducted in image adjustment processing section 24 shown in FIG. 13, embodiment 1-embodiment 3 will be detailed in the following.

Embodiment 1

Figure 14:
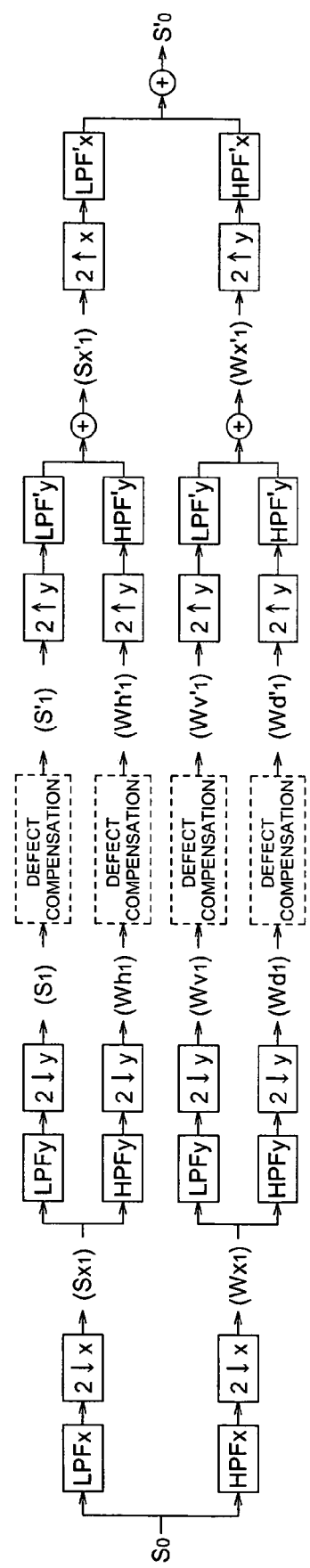
FIG. 14 shows a block diagram representing a process for compensating for the image signals by employing a bi-orthogonal wavelet conversion of level 1 in embodiment 1.

In the embodiment 1, the bi-orthogonal wavelet transform is applied for compensating for the defect pixel of the image signals. FIG. 14 shows a block diagram of the system of embodiment 1 in regard to the bi-orthogonal wavelet transform of the image signals, performed in image adjustment processing section 24.

The bi-orthogonal wavelet transform of level 1 is conducted with respect to every image signal of R, G, B. Incidentally, in FIG. 14, each of image signals is comprehensively represented by $S_0$.

Initially, image signals $S_0$ is processed by low-pass filter $LPF_x$ of the direction of "x" and high-pass filter $HPF_x$ of the direction of "y" to decompose them into low frequency band component SX1 and high frequency band component WX1 by applying the down-sampling operation in the direction of "x".

Successively, the filter processing and the down-sampling processing the direction of "y" are applied to both low frequency band component $SX_1$ and high frequency band component $WX_1$ by means of low-pass filter $LPF_y$ and high-pass filter $HPF_y$, so as to acquire low frequency band component $S_1$ and three high frequency band components $Wh_1$, $Wv_1$, $Wd_1$.

Incidentally, the filters having the following coefficients (Cohen, Daubechies, Feauveau 5-3) shown in Table 1 are employed in the bi-orthogonal wavelet transform of level 1 and its inverse-transform.

TABLE 1

| | Forward-transform | | Inverse-transform | |
| --- | --- | --- | --- | --- |
| x | HPF | LPF | HPF' | LPF' |
| −2 | | −0.176777 | 0.176777 | |
| −1 | 0.353553 | 0.353553 | 0.353553 | 0.353553 |
| 0 | −0.707107 | 1.06066 | −1.06066 | 0.707107 |
| 1 | 0.353553 | 0.353553 | 0.353553 | 0.353553 |
| 2 | | −0.176777 | 0.176777 | |

Incidentally, in Table 1, the coefficients for x=0 corresponds to a current pixel currently being processed, the coefficients for x=−1 corresponds to a pixel just before the current pixel, the coefficients for x=1 corresponds to a pixel just after the current pixel (following as well).

Next, with respect to the defect pixel recognized by recognizing section 29, the interpolation processing is applied to each of low frequency band component $S_1$ and high frequency band components $Wh_1$, $Wv_1$, $Wd_1$, based on the signal intensities of non-defect pixels adjacent to the defect pixel, to acquire low frequency band component S1' and high frequency band components $Wh_1'$, $Wv_1'$, $Wd_1'$, in each of which the signal intensity of the defect pixel is compensating for.

Then, the image signal $S_0'$ is restructured from compensated low frequency band component $S_1'$ and compensated high frequency band components $Wh_1'$, $Wv_1'$, $Wd_1'$ by means of the inverse-transform operation. FIG. 14 shows a restructuring process of the image signals $S_0'$. As shown in FIG. 14, initially, signal $SX_1'$ is obtained by adding the signals, acquired by respectively applying the up-sampling processing and the predetermined filter processing to low frequency band component S1' and high frequency band component $Wh_1'$, to each other. Further, signal $WX_1'$ is obtained by adding the signals, acquired by respectively applying the up-sampling processing and the predetermined filter processing to tow high frequency band components $Wv_1'$, $Wd_1'$, to each other, as well. Finally, the image signal $S_0'$ is restructured by respectively applying the up-sampling processing and the predetermined filter processing to signal $SX_1'$ and signal $WX_1'$, to each other.

According to the embodiment 1 of the present invention, by applying the bi-orthogonal wavelet transform to the image signals and by applying the interpolation processing to the high frequency band components and the low frequency band component, it becomes possible to obtain an output image having an impression naturally compensated for without generating discontinuity giving a sense of slight unevenness to the image.

Embodiment 2

Figure 15:
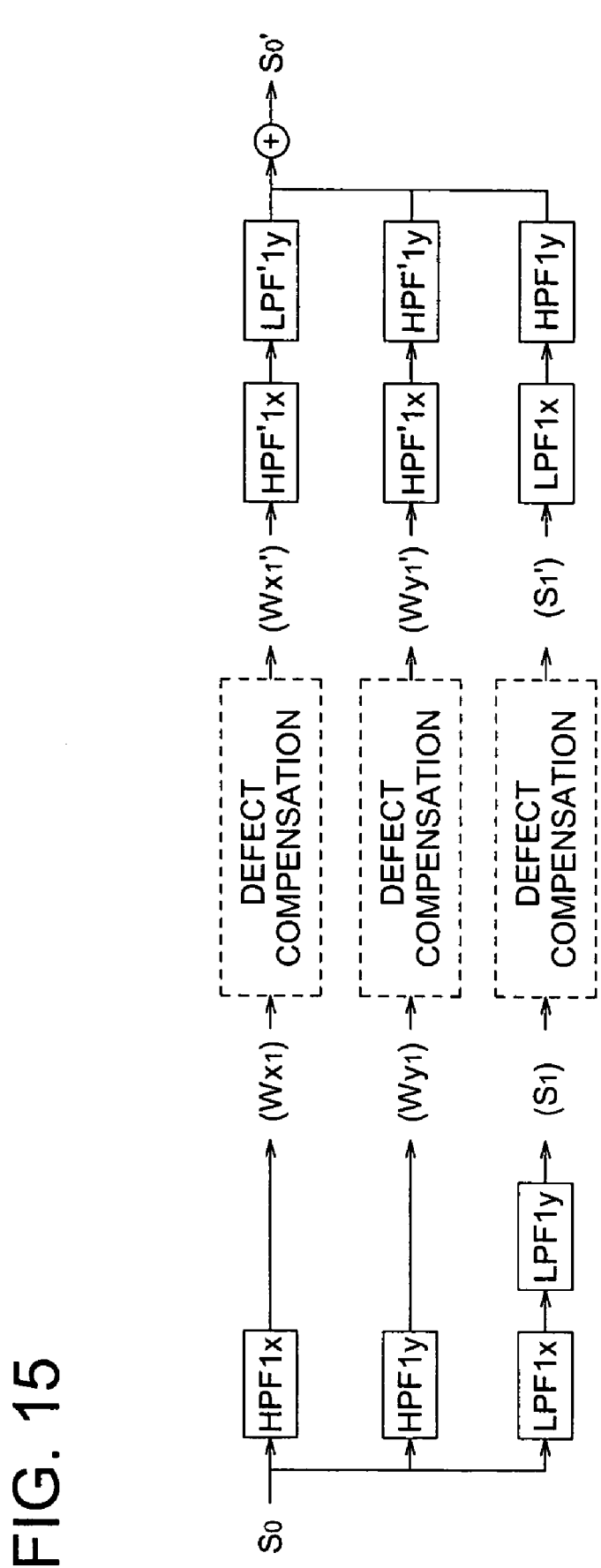
FIG. 15 shows a block diagram representing a process for compensating for the image signals by employing a bi-orthogonal wavelet conversion of level 1 in embodiment 2.

Next, embodiment 2 will be detailed in the following. In the embodiment 2, the Dyadic Wavelet transform is applied to the image signals to compensate for the defect pixel of the image signals. FIG. 15 shows a block diagram of the system of embodiment 1 in regard to the Dyadic Wavelet transform of the image signals, performed in image adjustment processing section 24.

As shown in FIG. 15, when performing the Dyadic Wavelet transform of level 1, initially, the image signal "$S_0$" is decomposed into two high frequency band components $WX_1$, $WY_1$ and single low frequency band component Si by means of high-pass filters $HPF1_x$ $_{HPF1y}$ and low-pass filters $LPF1_x$, $LPF1_y$ having filter coefficients of level 1 in the direction of "x" and the direction of "y". Incidentally, the filter coefficients employed for each of the filters are shown in Table 2.

TABLE 2

| x | HPF1 | LPF1 | HPF'1 | LPF'1 |
| --- | --- | --- | --- | --- |
| −3 | | | 0.0078125 | 0.0078125 |
| −2 | | | 0.054685 | 0.046875 |
| −1 | | 0.125 | 0.171875 | 0.1171875 |
| 0 | −2.0 | 0.375 | −0.171875 | 0.65625 |
| 1 | 2.0 | 0.375 | −0.054685 | 0.1171875 |
| 2 | | 0.125 | −0.0078125 | 0.046875 |
| 3 | | | | 0.0078125 |

Incidentally, in Table 2, the coefficients for x=0 corresponds to a current pixel currently being processed, the coefficients for x=−1 corresponds to a pixel just before the current pixel, the coefficients for x=1 corresponds to a pixel just after the current pixel.

Further, although the Dyadic Wavelet transform of level 1 is conducted in the present embodiment, the filters having coefficients, which are different relative to each other for every level, are employed in the general-purpose Dyadic Wavelet transform. A coefficient obtained by inserting $2_{n-1}-1$ zeros between coefficients of filters on level 1 is used as a filter coefficient on level "n" (refer to the aforementioned document).

Each of the compensation coefficients $\gamma_i$ determined in responds to the level "i" of the Dyadic Wavelet transform is shown in Table 3.

TABLE 3

| i | γ |
| --- | --- |
| 1 | 0.66666667 |
| 2 | 0.89285714 |
| 3 | 0.97087379 |
| 4 | 0.99009901 |
| 5 | 1 |

The image signals are compensated for by means of the interpolation processing, based on signal intensities of non-defect pixels adjacent to the defect pixel, for the defect pixel included in frequency band components $Wx_1$, $Wy_1$ and low frequency bad component $S_1$, both acquired by the above-mentioned filter processing.

Then, image signal $S_0'$ is restructured from compensated low frequency band component $S_1'$ and compensated high frequency band components $Wx_1'$, $Wy_1'$ by means of the inverse-transform operation. FIG. 15 shows a restructuring process of the image signals $S_0'$. As shown in FIG. 15, the image signal $S_0'$ is restructured by adding the signals, one of which is acquired by applying the filter processing by means of low-pass filters LPF1x, LPF1y, being the same as those employed in the Dyadic Wavelet transform of level 1, to low frequency band component $S_1'$, and another one of which is acquired by applying the filter processing by means of high-pass filters HPF'1x, HPF'1y, and low-pass filters LPF'1x, LPF'1y, for inverse-transform, to high frequency band components $Wx_1$, $Wy_1$, to each other.

According to the embodiment 2 of the present invention, by applying the Dyadic Wavelet transform to the image signals and by applying the interpolation processing to the high frequency band components and the low frequency band component, it becomes possible to obtain an output image having an impression naturally compensated for without generating discontinuity giving a sense of slight unevenness to the image.

Further, unlike the orthogonal wavelet transform or the bi-orthogonal wavelet transform, the Dyadic Wavelet transform does not require the down-sampling operation when converting the image signals. Accordingly, it becomes possible to conduct the compensation processing of the defect pixel in more detail than ever, without thinning out the defect pixel itself and/or the non-defect pixels adjacent to the defect pixel. Therefore, even for an image having fine structures such as a close-up image of human face, it becomes possible to compensate for the image so as to obtain a natural image without spoiling the expression of the face or the feel of its material.

Incidentally, although the Dyadic Wavelet transform of level 1 is applied to the image signals in the embodiment 2, it is needless say that the present invention is not limited to the above, but the Dyadic Wavelet transform of higher level would be possibly applied.

Embodiment 3

Next, embodiment 3 will be detailed in the following. In the embodiment 3, when recognizing section 29 conducts the recognizing the defect pixel based on the defect detecting signal, initially, the multi-resolution conversion processing is applied to the defect detecting signal in image adjustment processing section 24. Recognizing section 29 recognizes the presence or absence of the defect pixel, based on the high frequency band components acquired by the multi-resolution conversion processing.

Figure 16:
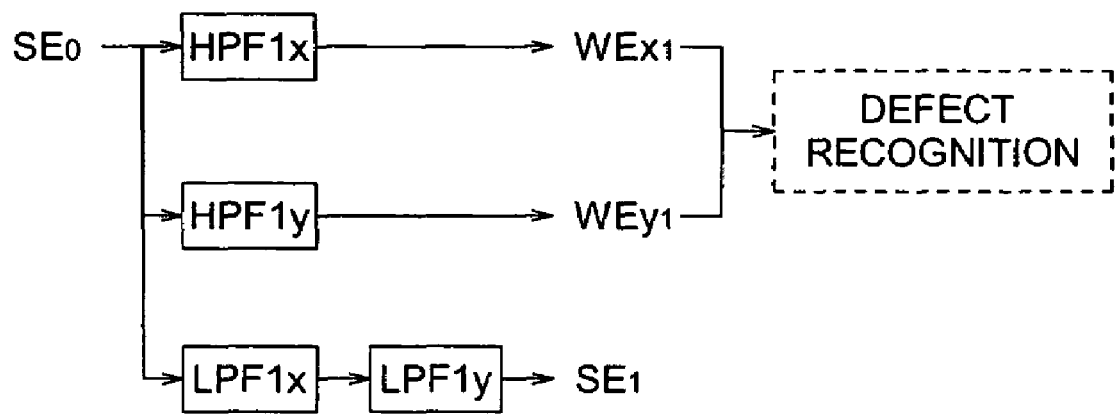
FIG. 16 shows a block diagram representing a process for recognizing the defect pixel by applying the Dyadic Wavelet transform of level 1 in embodiment 3.

FIG. 16 shows a system block diagram in regard to the multi-resolution conversion processing of defect detecting signal $SE_0$, performed in image adjustment processing section 24, in embodiment 3. In this embodiment, the Dyadic Wavelet transform is employed for the multi-resolution conversion. The defect detecting signal $SE_0$ is decomposed into two high frequency band components $WEX_1$, $WEY_1$ and a single low frequency band component $SE_1$ by conducting the filter processing by means of high-pass filters HPF1x, HPF1y in the directions of "x" and "y" and low-pass filters LPF1x, LPF1y in the directions of "x" and "y", both having filter coefficients of level 1. Incidentally, the filter coefficients employed for each of the filters are shown in Table 2.

Then, recognizing section 29 compares the signal intensities of high frequency band components $WEX_1$, $WEY_1$ with each other, to determine whether or not a certain specific pixel is the defect pixel. When determining that the specific pixel is the defect pixel, image adjustment processing section 24 applies the Dyadic Wavelet transform of level 1 to the image signals in the same manner as that performed in embodiment 2, and applies the interpolation processing, based on the signal intensities of non-defect pixels adjacent to the defect pixel, to high frequency band components $Wx_1$, $Wy_1$ and low frequency band component $S_1$, so as to compensating for the image signals.

Since high frequency band components $Wx_1$, $Wy_1$ of defect detecting signal $SE_0$, acquired by applying the Dyadic Wavelet transform, include little noise component, it becomes possible to accurately recognize the defect pixel. Further, by recognizing the defect pixel in a multi-resolution space and by compensating for the image signal corresponding to the recognized defect pixel in the same multi-resolution space, it becomes possible to make the compensated image having more natural impression than ever.

Incidentally, although the defect recognition is conducted by employing the high frequency band components acquired by applying the Dyadic Wavelet transform of level 1, serving as the multi-resolution conversion processing for defect detecting signal $SE_0$, in the embodiment 3, it would be more desirable for improving the defect detecting accuracy that the combination of the high frequency band components of level 1 and other high frequency band components acquired by applying the Dyadic Wavelet transform of level 2 and/or higher level is employed for the defect recognition. Further, without limiting to the Dyadic Wavelet transform, other multi-resolution conversion processing, including the orthogonal wavelet transform, the bi-orthogonal wavelet transform, etc., can be also employed, as needed.

As described in the foregoing, according to the present invention, the following effects can be attained.

(1) By compensating for the defect pixel so that first order differential values of image signals of the defect pixel and those of the non-defect pixels adjacent to the defect pixel continue to each other, it becomes possible to obtain the compensated image as a natural image without generating discontinuity, which yields slight unevenness in the image, and without giving a sense of incongruity to the viewer.

(2) By applying the multi-resolution conversion processing to the image signals, and then, applying the compensation processing to acquired multi-resolution signals, and finally, applying a multi-resolution inverse-conversion processing, it becomes possible to compensate for the defect pixel so that first order differential values of image signals of the defect pixel and those of non-defect pixels adjacent to the defect pixel continue to each other. It becomes possible to obtain the compensated image as a natural image without generating discontinuity, which yields slight unevenness in the image, and without giving a sense of incongruity to the viewer.

(3) Since the down-sampling operation is not required when converting the image signals, it becomes possible to conduct the compensation processing of the defect pixel in more detail than ever, without thinning out the defect pixel itself and/or the non-defect pixels adjacent to the defect pixel. Therefore, even for an image having fine structures such as a close-up image of human face, it becomes possible to compensate for the image so as to obtain a natural image without spoiling the expression of the face or the feel of its material.

(4) Since the high frequency band components of the defect detecting signals, acquired by applying the Dyadic Wavelet transform, include little noise component, it becomes possible to accurately recognize the defect pixel. Further, by recognizing the defect pixel in a multi-resolution space and by compensating for the image signal corresponding to the recognized defect pixel in the same multi-resolution space, it becomes possible to make the compensated image having more natural impression than ever.

Disclosed embodiment can be varied by a skilled person without departing from the spirit and scope of the invention.

What is claimed is:

1. An image signal processing apparatus comprising:
an image signal acquiring section to acquire image signals which represent an image recorded on a recording medium;
a recognizing section to recognize a presence or absence of a defect pixel possibly included in said image signals; and
a compensating section to compensate for said defect pixel recognized by said recognizing section;
wherein said compensating section compensates for said defect pixel so that first order differential values of image signals of said defect pixel and first order differential values of image signals of non-defect pixels adjacent to said defect pixel are made to be continuous.

2. The apparatus of claim 1, wherein said compensating section initially applies a multi-resolution conversion processing to said image signals so as to decompose said image signals into high frequency band components and a low frequency band component, and then, compensates for signal intensities of said high frequency band components and a signal intensity of said low frequency band component, respectively, and then, applies a multi-resolution inverse-conversion processing to compensated high frequency band components and a compensated low frequency band component so as to compensate for said defect pixel included in said image signals.

3. The apparatus of claim 2, wherein said multi-resolution conversion processing comprises a Dyadic Wavelet transform.

4. The apparatus of claim 1, wherein said image signal acquiring section acquires said image signals by scanning said image recorded on said recording medium with an image reading light.

5. The apparatus of claim 4, further comprising:
a defect-detecting signal acquiring section to acquire defect detecting signals by scanning said image recorded on said recording medium with a defect detecting light;
wherein said recognizing section applies a multi-resolution conversion processing to said defect detecting signals acquired by said defect-detecting signal acquiring section, and then, recognizes said presence or absence of said defect pixel, based on converted signals.

6. The apparatus of claim 5, wherein said multi-resolution conversion processing comprises a Dyadic Wavelet transform.

7. An image signal processing method comprising:
acquiring image signals which represent an image recorded on a recording medium;
recognizing a presence or absence of a defect pixel possibly included in said image signals;
compensating for said recognized defect pixel
wherein said defect pixel is compensated for so that first order differential values of image signals of said defect pixel and first order differential values of image signals of non-defect pixels adjacent to said defect pixel are made to be continuous.

8. The method of claim 7, wherein a multi-resolution conversion processing is initially applied to said image signals so as to decompose said image signals into high frequency band components and a low frequency band component, and then, signal intensities of said high frequency band components and a signal intensity of said low frequency band component are respectively compensated for, and then, a multi-resolution inverse-conversion processing is applied to compensated high frequency band components and a compensated low frequency band component so as to compensate for said defect pixel included in said image signals.

9. The method of claim 8, wherein said multi-resolution conversion processing comprises a Dyadic Wavelet transform.

10. The method of claim 7, wherein said image signals are acquired by scanning said image recorded on said recording medium with an image reading light.

11. The method of claim 10, further comprising:
acquiring defect detecting signals by scanning said image recorded on said recording medium with a defect detecting light;
wherein a multi-resolution conversion processing is applied to said defect detecting signals, and then, said presence or absence of said defect pixel is recognized, based on converted signals.

12. The method of claim 11, wherein said multi-resolution conversion processing comprises a Dyadic Wavelet transform.

13. A computer-readable medium having a computer program stored thereon which is executable by a computer to cause the computer to perform functions comprising:
acquiring image signals which represent an image recorded on a recording medium;
recognizing a presence or absence of a defect pixel possibly included in said image signals;
compensating for said defect pixel
wherein said defect pixel is compensated for so that first order differential values of image signals of said defect pixel and first order differential values of image signals of non-defect pixels adjacent to said defect pixel are made to be continuous.

14. The computer-readable medium of claim 13, wherein a multi-resolution conversion processing is initially applied to said image signals so as to decompose said image signals into high frequency band components and a low frequency band component, and then, signal intensities of said high frequency band components and a signal intensity of said low frequency band component are respectively compensated for, and then, a multi-resolution inverse-conversion processing is applied to compensated high frequency band components and a compensated low frequency band component so as to compensate for said defect pixel included in said image signals.

15. The computer-readable medium of claim 14, wherein said multi-resolution conversion processing comprises a Dyadic Wavelet transform.

16. The computer-readable medium of claim 13, wherein said image signals are acquired by scanning said image recorded on said recording medium with an image reading light.

17. The computer-readable medium of claim 16, wherein the computer program causes the computer to further perform a function comprising:

acquiring defect detecting signals by scanning said image recorded on said recording medium with a defect detecting light;

wherein a multi-resolution conversion processing is applied to said defect detecting signals, and then, said presence or absence of said defect pixel is recognized, based on converted signals.

18. The computer-readable medium of claim 17, wherein said multi-resolution conversion processing comprises a Dyadic Wavelet transform.

19. An apparatus for recording an output image onto an outputting medium, said apparatus comprising:
- an image signal acquiring section to acquire image signals which represent an image recorded on a recording medium;
- a recognizing section to recognize a presence or absence of a defect pixel possibly included in said image signals;
- a compensating section to compensate for said defect pixel recognized by said recognizing section; and
- an image recording section to record said output image onto said outputting medium, based on compensated image signals outputted from said compensating section;
- wherein said compensating section compensates for said defect pixel so that first order differential values of image signals of said defect pixel and first order differential values of image signals of non-defect pixels adjacent to said defect pixel are made to be continuous.

20. The apparatus of claim 19, wherein said compensating section initially applies a multi-resolution conversion processing to said image signals so as to decompose said image signals into high frequency band components and a low frequency band component, and then, compensates for signal intensities of said high frequency band components and a signal intensity of said low frequency band component, respectively, and then, applies a multi-resolution inverse-conversion processing to compensated high frequency band components and a compensated low frequency band component so as to compensate for said defect pixel included in said image signals.

21. The apparatus of claim 20, wherein said multi-resolution conversion processing comprises a Dyadic Wavelet transform.

22. The apparatus of claim 19, wherein said image signal acquiring section acquires said image signals by scanning said image recorded on said recording medium with an image reading light.

23. The apparatus of claim 22, further comprising:
- a defect-detecting signal acquiring section to acquire defect detecting signals by scanning said image recorded on said recording medium with a defect detecting light;
- wherein said recognizing section applies a multi-resolution conversion processing to said defect detecting signals acquired by said defect-detecting signal acquiring section, and then, recognizes said presence or absence of said defect pixel, based on converted signals.

24. The apparatus of claim 23, wherein said multi-resolution conversion processing comprises a Dyadic Wavelet transform.

* * * * *